(12) United States Patent
Takeuchi et al.

(10) Patent No.: US 8,331,793 B2
(45) Date of Patent: Dec. 11, 2012

(54) OPTICAL TRANSMISSION APPARATUS AND METHOD

(75) Inventors: Osamu Takeuchi, Kawasaki (JP); Masahiro Shioda, Kawasaki (JP); Yasuhiko Aoki, Kawasaki (JP); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 12/813,810

(22) Filed: Jun. 11, 2010

(65) Prior Publication Data
US 2010/0322630 A1 Dec. 23, 2010

(30) Foreign Application Priority Data

Jun. 19, 2009 (JP) ................. 2009-146056

(51) Int. Cl.
*H04B 10/00* (2006.01)
(52) U.S. Cl. ........................................ 398/140
(58) Field of Classification Search .............. 398/140, 398/183
See application file for complete search history.

(56) References Cited

U.S. PATENT DOCUMENTS

| 7,362,779 B1 | 4/2008 | Zabezhinsky |
| 2009/0087194 A1 | 4/2009 | Nakashima et al. |

FOREIGN PATENT DOCUMENTS

JP 2009-089194 4/2009

OTHER PUBLICATIONS

T. Malpass, "40 GE OTN Support Consideration", Huawei, Nov. 2007.*

* cited by examiner

*Primary Examiner* — Shi K Li
(74) *Attorney, Agent, or Firm* — Staas & Halsey LLP

(57) ABSTRACT

An optical transmission apparatus including a transmitting OTL processor to rearrange a data string stored in a frame into a plurality of logical lanes, and set a lane ID used to identify in which logical lane a beginning of the data string is arranged among the plurality of logical lanes in a non-scramble area in an overhead of the frame, and a receiving OTL processor to respectively identify the lane IDs included in the data string in the respective physical lanes rearranged, determine a generation state of a bit inversion and a lane replacement for each physical lane, compensate the bit inversion and the lane replacement so that the data string in the respective physical lanes becomes same state as the data string in the respective logical lanes, based on the identified result, and rearrange the compensated data string in the respective logical lanes so as to regenerate the frame.

16 Claims, 27 Drawing Sheets

FIG. 6

| 1:16 (FAS) | 17:32 | 33:48 | 49:64 | ... | 4065:4080 |
|---|---|---|---|---|---|
| 4081:4096 | 4097:5012 | 5013:5028 | 5029:5044 | ... | 9145:9160 |
| 9161:9176 | 9177:9192 | 9193:9208 | 9209:9224 | ... | 12225:12240 |
| 12241:12256 | 12257:12272 | 12273:12288 | 12289:12304 | ... | 16305:16320 |

FIG. 8

| LOGICAL LANE | 5:1 MULTIPLEX | | | | | |
|---|---|---|---|---|---|---|
| 1 | | | | | | |
| 2 | | | | | | |
| 3 | 5 | 4 | 3 | 2 | 1 | |
| 4 | | | | | | → X_I |
| 5 | | | | | | |
| 6 | | | | | | |
| 7 | | | | | | |
| 8 | 10 | 9 | 8 | 7 | 6 | |
| 9 | | | | | | → X_Q |
| 10 | | | | | | |
| 11 | | | | | | |
| 12 | | | | | | |
| 13 | 15 | 14 | 13 | 12 | 11 | |
| 14 | | | | | | → Y_I |
| 15 | | | | | | |
| 16 | | | | | | |
| 17 | | | | | | |
| 18 | 20 | 19 | 18 | 17 | 16 | |
| 19 | | | | | | → Y_Q |
| 20 | | | | | | |

FIG. 9

| LOGICAL LANE | 2:1 MULTIPLEX | | 10:4 MULTIPLEX | | | | | |
|---|---|---|---|---|---|---|---|---|
| 1 | 2 | 1 | 14 | 6 | 17 | 9 | 1 | →X_I |
| 2 | | | | | | | | |
| 3 | 4 | 3 | | | | | | |
| 4 | | | | | | | | |
| 5 | 6 | 5 | 16 | 8 | 19 | 11 | 3 | →X_Q |
| 6 | | | | | | | | |
| 7 | 8 | 7 | | | | | | |
| 8 | | | | | | | | |
| 9 | 10 | 9 | | | | | | |
| 10 | | | | | | | | |
| 11 | 12 | 11 | 18 | 10 | 2 | 13 | 5 | →Y_I |
| 12 | | | | | | | | |
| 13 | 14 | 13 | | | | | | |
| 14 | | | | | | | | |
| 15 | 16 | 15 | | | | | | |
| 16 | | | | | | | | |
| 17 | 18 | 17 | 20 | 12 | 4 | 15 | 7 | →Y_Q |
| 18 | | | | | | | | |
| 19 | 20 | 19 | | | | | | |
| 20 | | | | | | | | |

FIG. 14
TRANSMISSION STATE
(I,Q)
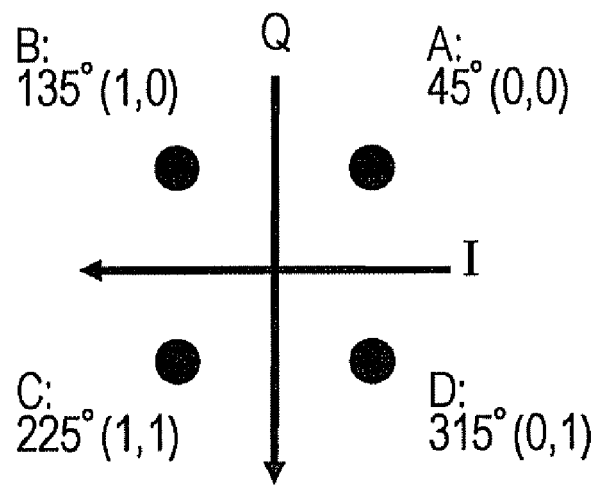
BIT LOGIC INVERSION
AND NO REPLACEMENT
NORMAL
RECEPTION STATE
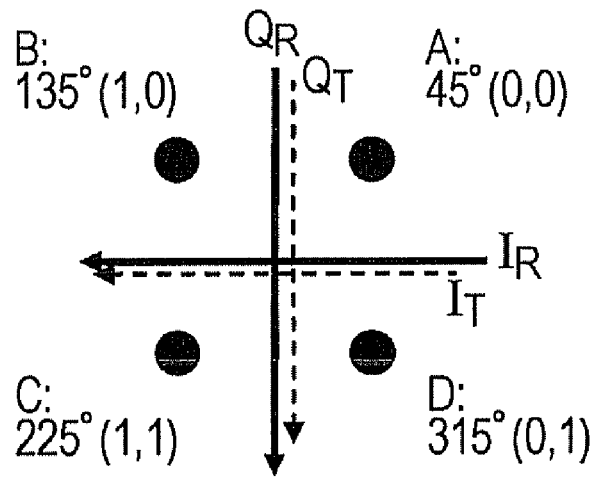

FIG. 15
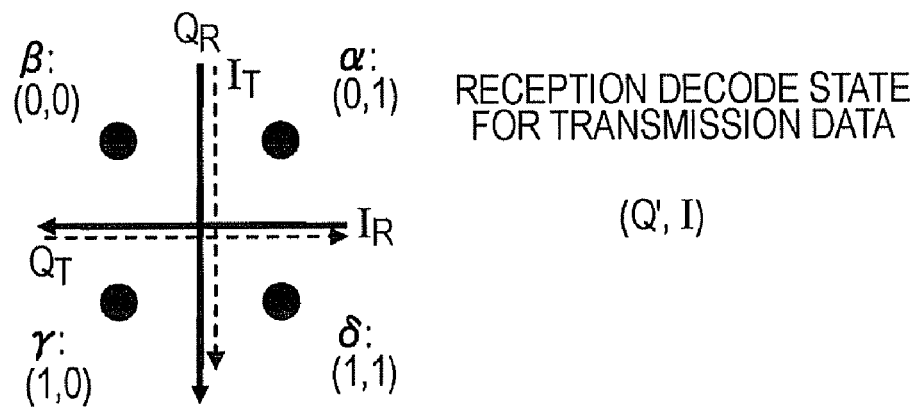
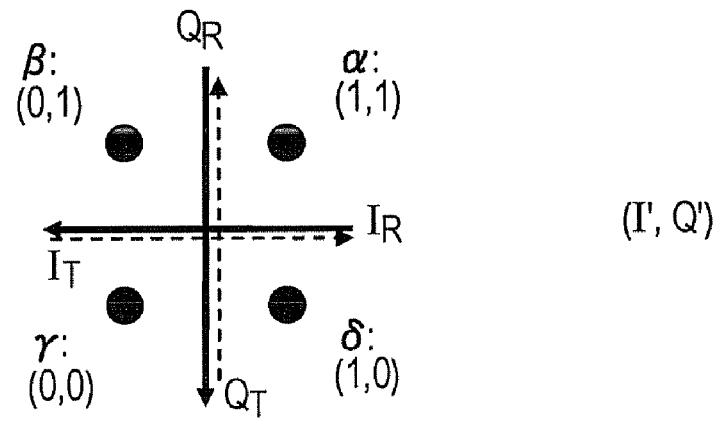
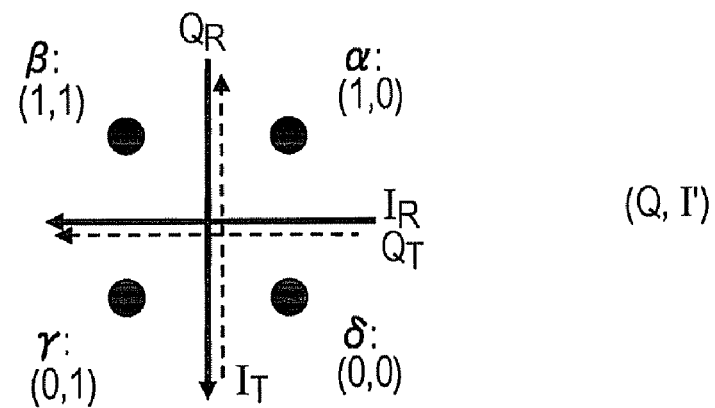

FIG. 16

| TRANSMISSION | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| X_I | X_I | X_I | X_I | X_I | X_Q' | X_Q' | X_Q' | X_Q' | X_Q | X_Q | X_Q | X_Q | X_I' | X_I' | X_I' | X_I' |
| X_Q | X_Q | X_Q | X_Q | X_Q | X_I | X_I | X_I | X_I | X_I' | X_I' | X_I' | X_I' | X_Q' | X_Q' | X_Q' | X_Q' |
| Y_I | Y_I | Y_Q' | Y_Q | Y_I | Y_I | Y_Q' | Y_Q | Y_I' | Y_I' | Y_Q | Y_Q' | Y_I | Y_I | Y_Q' | Y_Q' | Y_I' |
| Y_Q | Y_Q | Y_I | Y_I' | Y_Q | Y_Q | Y_I | Y_I' | Y_Q' | Y_Q' | Y_I' | Y_I | Y_Q | Y_Q | Y_I' | Y_I | Y_Q' |

| TRANSMISSION | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| X_I | Y_I | Y_Q' | Y_Q | Y_I' | Y_I | Y_Q' | Y_Q | Y_I' | Y_I | Y_Q' | Y_I | Y_Q' | Y_I | Y_Q' | Y_I | Y_Q' |
| X_Q | Y_Q | Y_I | Y_I' | Y_Q' | Y_Q | Y_I | Y_I' | Y_Q' | Y_Q' | Y_I | Y_Q' | Y_I | Y_Q' | Y_I | Y_Q' | Y_I |
| Y_I | X_I | X_I | X_I | X_I | X_Q | X_Q | X_Q | X_Q' | X_Q | X_Q | X_I | X_I | X_I' | X_I' | X_I' | X_I' |
| Y_Q | X_Q | X_Q | X_Q | X_Q | X_I | X_I | X_I' | X_Q' | X_Q | X_I | X_I' | X_Q' | X_Q' | X_I' | X_Q' | X_Q' |

FIG. 20

| PHYSICAL LANE PL | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| LOGICAL LANE LL | 16 | 17 | 18 | 19 | 20 | 11 | 12 | 13 | 14 | 15 | 6 | 7 | 8 | 9 | 10 | 1 | 2 | 3 | 4 | 5 |
| LOGIC INVERSION | ON | ON | ON | ON | ON | OFF | OFF | OFF | OFF | OFF | OFF | OFF | OFF | OFF | OFF | ON | ON | ON | ON | ON |

FIG. 22

| PHYSICAL LANE PL | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| LOGICAL LANE LL | 7 | 19 | 5 | 17 | 3 | 12 | 1 | 10 | 15 | 8 | 13 | 6 | 11 | 20 | 9 | 18 | 4 | 16 | 2 | 14 |
| LOGIC INVERSION | ON | OFF | OFF | ON | OFF | ON | ON | OFF | ON | OFF | OFF | ON | OFF | ON | ON | OFF | ON | OFF | OFF | ON |

OPTICAL TRANSMISSION APPARATUS AND METHOD

CROSS-REFERENCE TO RELATED APPLICATION

This application is based upon and claims the benefit of priority of the prior Japanese Patent Application No. 2009-146056, filed on Jun. 19, 2009, the entire contents of which are incorporated herein by reference.

FIELD

The embodiments discussed herein are related to an optical transmission apparatus and an optical transmission method.

BACKGROUND

In recent years, a demand for an optical transmission system corresponding to 40 gigabits per second (Gbps) or 100 Gbps has been increased. As realization means for the optical transmission system, the adoption of various modulation systems superior in frequency use efficiency, noise immunity, and the like is searched for. In particular, a multi-level modulation system with which multi-bit information is transmitted in one symbol time (time interval to transmit a modulated signal) attracts attention. For example, reviews on a system of combining multi-level modulation and polarization multiplex, a system of performing multi-level quadrature amplitude modulation through the combination of the phase and the amplitude, and the like are actively carried out.

In optical transmission system adopting the above-mentioned multi-level modulation system, depending on an operational environment of the system such as a state of a transmission line, a signal to be decoded on the reception side may be received in a different state from an original signal modulated on a transmission side in some cases. For this reason, a situation is known in which logic inversion and replacement of transmitted bits are generated in one symbol time, and the transmission data may not be normally received.

As a technology for detecting the above-mentioned logic inversion and replacement to perform the compensation, for example, Japanese Laid-open Patent Publication No. 2009-89194 discloses an optical transmission system based on a multi-level modulation system using the polarization multiplex in which bits for detection having a particular pattern set in accordance with the number of bits transmitted in one symbol time is assigned to a transmission signal, an optical signal modulated in accordance with the transmission signal is transmitted from an optical transmitter, and in an optical receiver, by using the bits for detection contained in the reception signal, the logic inversion or bit swap (replacement of bits) of the reception data is detected to perform the compensation.

Also, as a related technology for performing respective processings for the above-mentioned the transmission signal and the reception signal at a high speed, a technology is known in which data stored in a frame is rearranged in a plurality of logical lanes, and a signal processing is carried out in the respective the logical lanes. With regard to this frame rearrangement, for example, U.S. Pat. No. 7,362,779 discloses a method of rearranging data while rotating the logical lanes when the data in a plurality of frames is rearranged in the respective logical lanes.

SUMMARY

According to an aspect of the embodiment, there is provided an optical transmission apparatus transmitting and receiving an optical signal generated by a multi-level modulation system capable to transmit multi-bit information within one symbol-time, the optical transmission apparatus including a transmitting OTL processor to rearrange a data string stored in a frame into a plurality of logical lanes, and set a lane ID used to identify in which logical lane a beginning of the data string is arranged among the plurality of logical lanes in a non-scramble area in an overhead part of the frame, an optical transmitter to multiplex the data string rearranged into the plurality of logical lanes by the transmitting OTL processor corresponding to the multi-level modulation system, and generate a modulated optical signal based on the multiplexed data signal, an optical receiver to decode a received optical signal generated by the multi-level modulation system so as to regenerate a reception data, and rearrange a data string of the reception data in physical lanes of a same number as the logical lane, and a receiving OTL processor to respectively identify the lane IDs included in the data string in the respective physical lanes rearranged by the optical receiver, determine a generation state of a bit inversion and a lane replacement for each physical lane, compensate the bit inversion and the lane replacement so that the data string in the respective physical lanes becomes same state as the data string in the respective logical lanes, based on the identified result, and rearrange the compensated data string in the respective logical lanes so as to regenerate the frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of an OTUk frame division method according to the above-mentioned embodiment;

FIG. 8 is a diagram illustrating a method of multiplexing data strings in the respective logical lanes according to the above-mentioned embodiment;

FIG. 9 is a diagram illustrating another method of multiplexing the data strings in the respective logical lanes according to the above-mentioned embodiment;

FIG. 14 is a diagram illustrating examples of a transmission state of an optical signal based on the DP-QPSK system and a normal reception state;

FIG. 15 is a diagram illustrating examples of reception states in a case where bit inversion and replacement with regard to the optical signal based on DP-QPSK system are generated;

FIG. 16 is a diagram illustrating combinations of reception states that may be generated at the time of transmission of the optical signal based on the DP-QPSK system;

FIG. 20 is a diagram illustrating a correspondence table for a physical lane and a logical lane in FIG. 19;

FIG. 22 is a diagram illustrating a correspondence table for the physical lane and the logical lane in FIG. 21;

DESCRIPTION OF EMBODIMENTS

According to the compensation method in the related art described in the above-mentioned Japanese Laid-open Patent Publication No. 2009-89194, the pattern of the bits for detection is devised so as not to lead to the logic inversion and the bit swap, and by identifying the pattern which does not lead to the logic inversion on the reception side, a generation state of the bit swap may be detected. Also, by identifying the pattern which does not lead to the bit swap on the reception side, the generation state of the logic inversion may be detected. However, such a processing for the bits for detection on the reception side, in other words, the processing of identifying the pattern which does not lead to one of the logic inversion and the bit swap and of detecting the generation stage of the other may generate logic inversion and bit swap for the bits for detection itself, and a processing time, is extended. In order to shorten the processing time, it is effective to apply the above-mentioned signal processing based on the frame rearrangement, but the application of the signal processing does not necessarily prevent the generation of the logic inversion and the bit swap for the bit for detection itself. For this reason, the compensation system in the related art has a problem that a limitation exists for an early stage detection on the logic inversion and the bit swap generated in the reception data to perform the compensation.

The above-mentioned compensation system in the related art is intended for the optical transmission system based on the multi-level modulation system using the polarization multiplex, but the logic inversion and the bit replacement generated in the reception data depending on the operational environment of the system such as the above-mentioned state of the transmission line may also be generated in a case where the optical signal based on the multi-level modulation system which does not use the polarization multiplex is transmitted or received. Irrespective of whether or not the polarization multiplex is applied, the detection of the logic inversion and the bit swap in an early stage to be certainly compensated is an issue common to optical transmission systems dealing with the multi-level modulation system.

Hereinafter, embodiments will be described in detail with reference to the accompanying drawings.

First Embodiment

Figure 1:
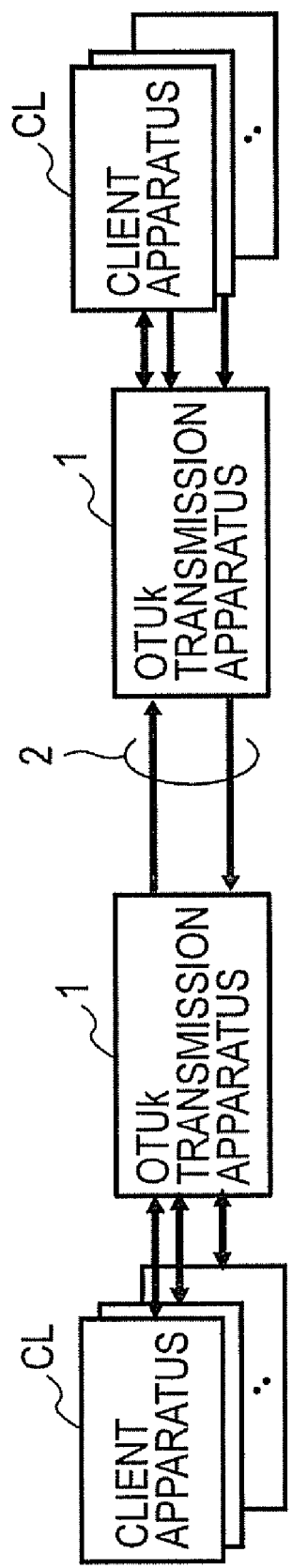
FIG. 1 is a diagram illustrating an entire configuration of an optical transmission system according to an embodiment.

FIG. 1 is a diagram illustrating an entire configuration of an optical transmission system according to an embodiment. In FIG. 1, the optical transmission system according to the present embodiment is provided, for example, with an OTUk transmission apparatus 1 to which a plurality of client apparatuses CL are connected and a transmission line 2 for a mutual connection between the OTUk transmission apparatuses 1.

The OTUk transmission apparatus 1 adds plural pieces of overhead information and the like on a client signal sent from the respectively connected client apparatuses CL to form a frame structure corresponding to OTU (Optical channel Transport Unit) k of OTN (Optical Transport Network) standard. Then, the OTUk transmission apparatus 1 rearranges a data string stored in the OTUk frame into a data string composed in a plurality of logical lanes for the frame division, based on following OTL (Optical channel Transport Line). At this time, the OTUk transmission apparatus 1 sets a lane ID with which it is possible to identify in which lane the beginning of the data string in the OTUk frame is arranged among the plurality of logical lanes with respect to the data strings of the respective logical lanes when the data is processed on the reception side. It may be noted that the above-mentioned respective logical lanes are equivalent to respective parallel signals obtained by serial-parallel converting the high speed transmission signals dealt with in the OTUk transmission apparatus 1. Then, the number of logical lanes is equivalent to the number of parallel signals. Furthermore, the OTUk transmission apparatus 1 multiplexes the data strings in the respective logical lanes in accordance with the multi-level modulation system for the optical signals transmitted to the transmission line 2 and transmits the multi-level modulated optical signal to an opposite OTUk transmission apparatus 1 through the transmission line 2 by using the multiplexed signal.

Also, the OTUk transmission apparatus 1 receives the optical signal transmitted through the transmission line 2 and converts the optical signal into an electric signal, and after reproducing the reception data by performing a decoding processing on the electric signal, divides the data strings of the received data in the same number of physical lanes as the logical lanes at the time of the frame division on the transmission side. Then, the OTUk transmission apparatus 1 respectively identifies the lane IDs contained in the data string of the respective physical lanes, and on the basis of the identification results, determines a generation state of the bit inversion and the lane replacement for each physical lane to compensate the bit inversion and the lane replacement. It may be noted that the above-mentioned respective physical lanes are physical lanes which are decided depending on a structure of a circuit for performing a reception signal processing, and the order of the respective physical lanes are arbitrary irrespective of the order of the respective logical lanes on the transmission side. Furthermore, the OTUk transmission apparatus 1 reproduces the OTUk frame by using the respective data strings in which the bit inversion and the lane replacement are compensated and converts the data stored in the OTUk frame into a client signal to be transmit to the corresponding client apparatus CL.

It may be noted that the OTN is an optical network system standardized by ITU-T (International Telecommunication Union Telecommunication Standardization Sector). Also, the OTUk is relevant to one of OTU3 corresponding to 40 Gbps and OTU4 corresponding to 100 Gbps which are regulated in OTN. Furthermore, the OTL is a system for performing a signal processing by utilizing a lane defined by G.709 which is being established by ITU-T.

Figure 2:
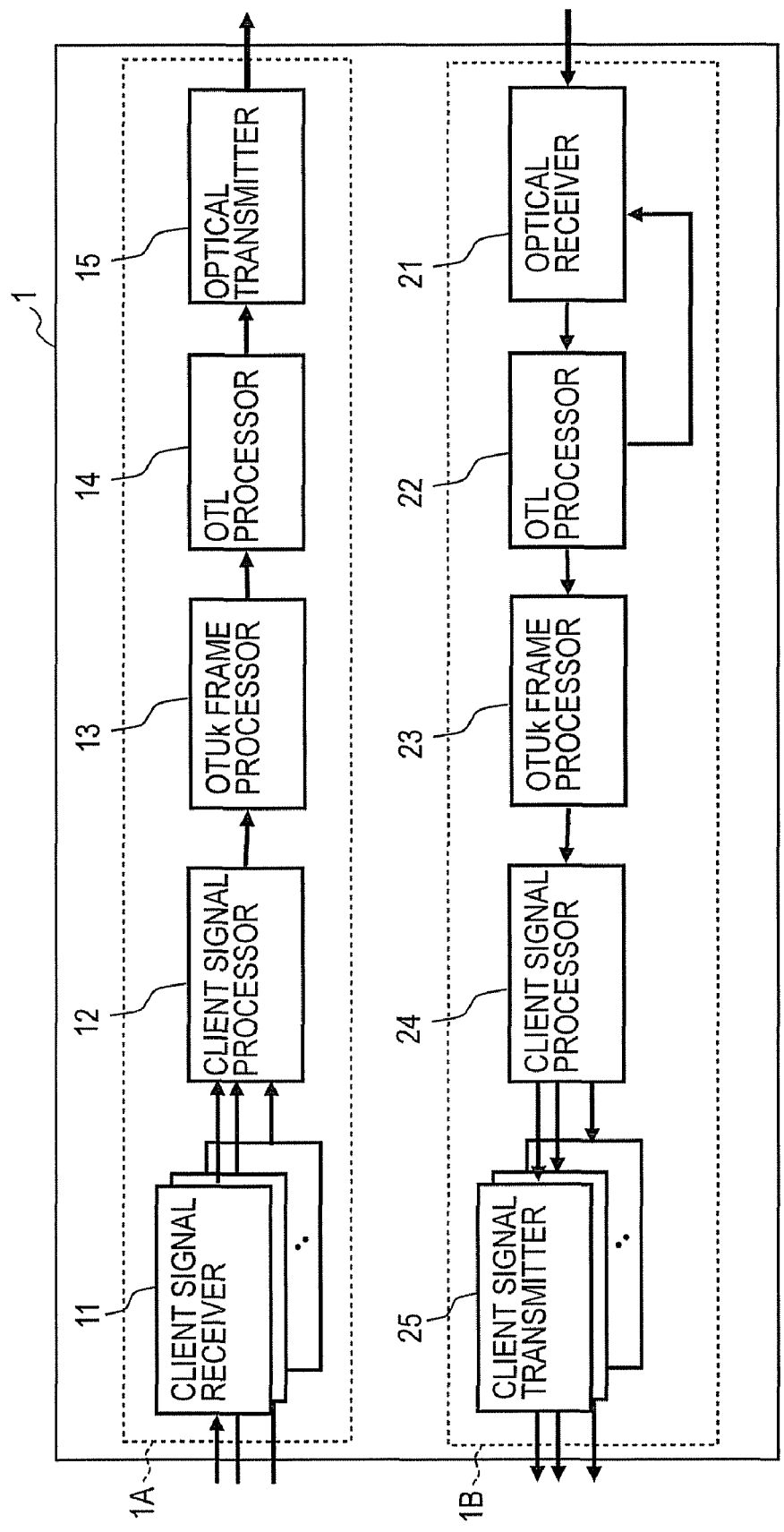
FIG. 2 is a block diagram illustrating a configuration example of an OTUk transmission apparatus according to the above-mentioned embodiment.

FIG. 2 is a block diagram illustrating a specific configuration example of the OTUk transmission apparatus 1. In FIG. 2, the OTUk transmission apparatus 1 has a transmission unit 1A configured to receive the (electric or optical) client signals sent from the plurality of client apparatuses CL and transmit the optical signals based on the multi-level modulation system to the transmission line 2. And the OTUk transmission apparatus 1 has a reception unit 1B configured to receive the optical signals based on the multi-level modulation system transmitted through the transmission line 2 and send the (electric or optical) client signals to the client apparatuses CL.

It may be noted that herein the example is illustrated in which the OTUk transmission apparatus 1 is provided with both the transmission unit 1A and the reception unit 1B, but the present embodiment is not limited to the above, and the OTUk transmission apparatus 1 connected to one end of the transmission line 2 may be provided with the transmission unit 1A and the OTUk transmission apparatus 1 connected to the other end of the transmission line 2 may be provided with the reception unit 1B.

The transmission unit 1A has, for example, a plurality of client signal receivers 11, a client signal processor 12, an OTUk frame processor 13, the OTL processor 14 functioning as frame division means, and an optical transmitter 15 functioning as optical transmission means. Each processor of the client signal processor 12, the OTUk frame processor 13, and the OTL processor 14 does not have the necessity for being an individual processor and may be put into practice by using a common processor.

The respective client signal receivers 11 correspond to the respective client apparatuses CL connected to the OTUk transmission apparatus 1, respectively, and receive the client signals sent from the respective client apparatuses CL. In a case where the client signal is an electric signal, the respective client signal receivers 11 outputs the electric signal to the client signal processor 12 and in a case where the client signal is an optical signal, the respective client signal receivers 11 converts the optical signal into the electric signal to be output to the client signal processor 12.

The client signal processor 12 performs a terminal processing on the output signal from the respective client signal receivers 11 to be output to the OTUk frame processor 13.

The OTUk frame processor 13 adds overhead information corresponding to OPU (Optical channel Payload Unit) and overhead information corresponding to ODU (Optical channel Data Unit) on the respective client signals subjected to the terminal processing by the OTUk frame processor 13 and further adds overhead information corresponding to OTU (Optical channel Transport Unit) k and an error correction (Forward Error Correction: FEC) byte to store the respective client signals in the OTUk frame.

Figure 3:
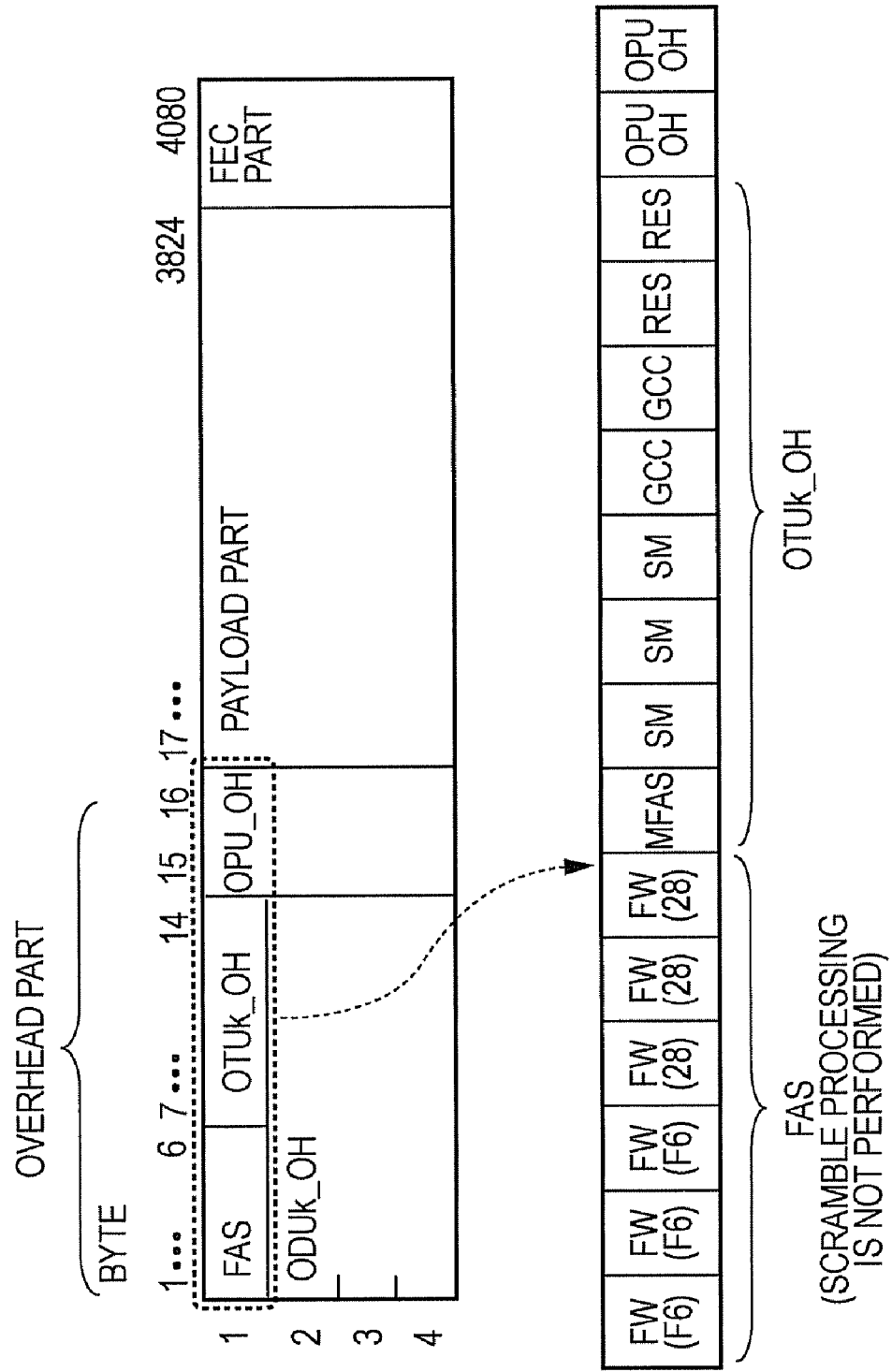
FIG. 3 is a diagram illustrating a specific structure of an OTUk frame.

FIG. 3 is a diagram illustrating a specific structure of the OTUk frame. As illustrated in an upper stage of FIG. 3, the OTUk frame has 4080 bytes×4 rows in one frame. In data strings in the respective rows, an overhead part, a payload part, and an FEC part are arranged in the stated order from the beginning. For the overhead part in the first row, FAS (Frame Alignment Signal) is stored in the first to sixth bytes, OTUk overhead information (OTUk_OH) is stored in the seventh to fourteenth bytes, OPU (Optical channel Payload Unit) overhead information (OPU_OH) is stored in the fifteenth and sixteenth bytes. For the overhead parts in the second and subsequent rows, ODU (Optical channel Data Unit) k overhead information (ODUk_OH) is stored. For the payload parts in the respective rows, client signals are stored.

A lower stage of FIG. 3 illustrates the overhead part in the first row while being expanded. The FAS at the beginning has a pattern of OA1 common to the first to third bytes and OA2 common to the fourth to sixth bytes as a frame synchronization pattern, in other words, a pattern of OA1, OA1, OA1, OA2, OA2, OA2 in the stated order from the beginning. For the OA1, as FW (Framing Word), in hexadecimal number, a fixed value of "F6" (bit string of "11110110") is set. Also, for OA2, as the FW, in hexadecimal number, a fixed value of "28" (bit string of "00101000") is set. That is, the FAS arranged at the beginning of the data string in the OTUk frame has a fixed pattern of "F6, F6, F6, 28, 28, 28". Also, this FAS is regulated in a non-scramble area where a scramble processing is not performed. In other words, in an area other than the FAS in the OTUk frame, the scramble processing may be performed.

For the OTUk_OH following the FAS, MFAS (Multi Frame Alignment Signal) is stored in the seventh byte, SM (Section Monitoring) information is stored in the eighth to tenth bytes, and GCC (General Communication Channel) information is stored in the eleventh and twelfth bytes. It may be noted that the thirteen and fourteenth bytes are RSE (Reserved for future international standardization) and are not used.

Figure 4:
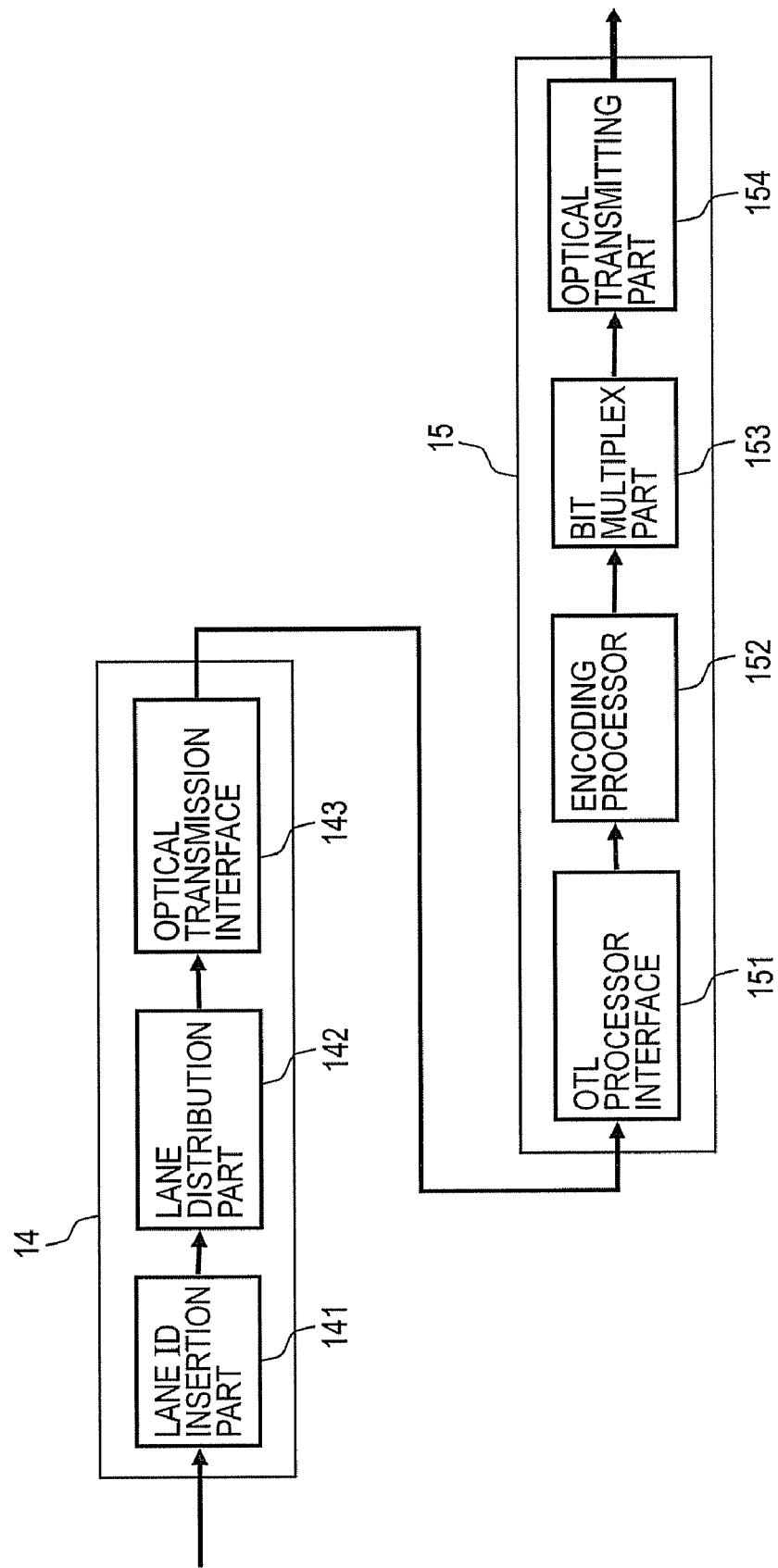
FIG. 4 is a block diagram illustrating configuration examples of an OTL processor and an optical transmitter in a transmission unit according to the above-mentioned embodiment.

As illustrated in the upper left of FIG. 4, for example, the OTL processor 14 of FIG. 2 has a lane ID insertion part 141, a lane distribution part 142, and an optical transmission interface 143.

With regard to the respective OTUk frames of the signal output from the OTUk frame processor 13, the lane ID insertion part 141 replaces at least one byte contained in the FAS of the overhead part by a lane ID. In case where the data in OTUk frame is rearranged by the lane distribution part 142 in the subsequent stage in a plurality of logical lanes, it is possible to identify the logical lane where the beginning of the data string in the OTUk frame is arranged. For the above-mentioned lane ID, for example, continuous values corresponding to frame numbers assigned to a plurality of OTUk frames in the arrangement order may be assigned in a necessary range (to be more specific a range between 0 and 239 or the like in decimal number). In this case, by following a regularity of the rearrangement by the lane distribution part 142 which will be described below, it is possible to uniquely decide in which logical lane the beginning of the data string in the OTUk frame corresponding to the continuous value of the lane ID is arranged.

Figure 5:
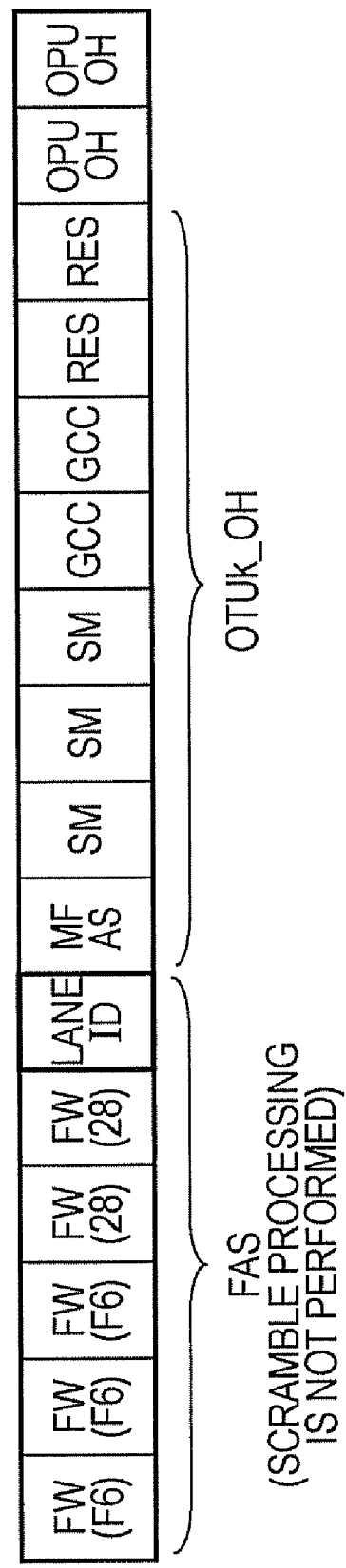
FIG. 5 is a diagram illustrating an example of an overhead part where replacement of lane IDs is conducted according to the above-mentioned embodiment.

FIG. 5 illustrates an example of the above-mentioned overhead part where the replacement of the lane IDs is conducted. In the example of FIG. 5, the fixed value the overhead part at the sixth byte of the FAS in the OTUk frame is replaced by the lane ID. As described above, as the FAS is regulated in the non-scramble area, the replacement for the respective bits constituting the FAS is not generated on the reception side. It may be however noted that the logic inversion may be generated due to the operational environment of the system. For this reason, as will be described in detail below, by performing an identification processing for the above-mentioned lane ID on the reception side, even where the replacement by the lane distribution part 142 is performed, it is possible to identify in which logical lane the beginning of the data string in the OTUk frame is located.

It may be noted that FIG. 5 illustrates an example in which the fixed value "28" at the sixth byte of the FAS is replaced by the lane ID, but any of the six bytes constituting the FAS may be arbitrarily replaced by the lane ID. Also, if the bit pattern of the FAS is detected on the reception side, two or more bytes among the six bytes constituting the FAS may be replaced by the lane ID.

The lane distribution part 142 of FIG. 4 divides the OTUk frame where the lane ID is set into the FAS by the lane ID insertion part 141 for a previously determined number of bytes to be rearranged in a plurality of logical lanes, based on the OIL. The data strings rearranged in the plurality of logical lanes by the lane distribution part 142 are sent via the optical transmission interface 143 to the optical transmitter 15.

FIG. 6 is a diagram illustrating an example of an OTUk frame division method in the lane distribution part 142. In this example of FIG. 6, by dividing the one frame (1 to 16320 bytes) of the OTUk for every 16 bytes, the conversion is made into 255 blocks×4 rows. A notation of "1:16" to "16305:16320" in the drawing denotes (position for a starting byte): (position for an ending byte) in the respective blocks. For example, in a block notated with "1:16" in the upper left, data of the first to sixteenth bytes in the OTUk frame are stored. It may be noted that herein, the example is illustrated in which the OTUk frame is divided for every 16 bytes, but it is possible to arbitrarily decide every which bytes the OTUk frame is divided as a design matter.

Figure 7:
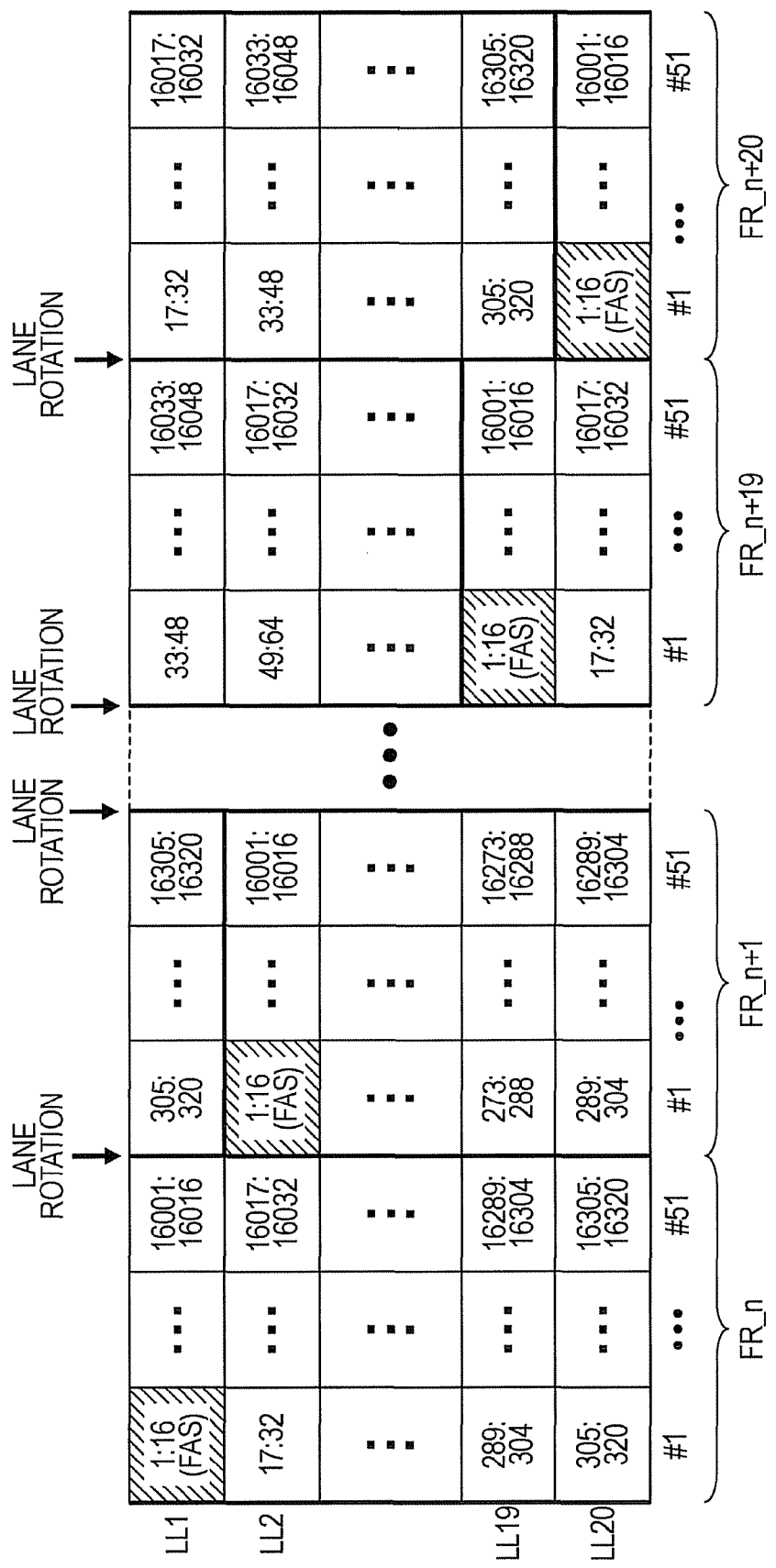
FIG. 7 is a diagram illustrating a method of rearranging the divided OTUk frames in 20 logical lanes according to the above-mentioned embodiment.

FIG. 7 is a diagram illustrating a method of rearranging the respective blocks of the OTUk frames divided for 16 bytes each (FIG. 6) in 20 logical lanes. First, with regard to the OTUk frame FR_n located at the n-th, the "1:16 (FAS)" block at the beginning is arranged at the first column #1 in the first logical lane LL1, and a following "17:32" block is arranged at the first column #1 in the second logical lane LL2. Then, in a similar manner, the "305:320" block at the twentieth block is arranged at the first column #1 of the twentieth logical lane LL20. When all the blocks at the first column #1 in the respective logical lanes LL1 to LL20 are filled, the processing of rearranging is shifted to the second column to the immediate right, and similarly as in the case of the above-mentioned column #1, the following blocks are arranged in the order from the second column in the first logical lane LL1 to the second column in the twentieth logical lane LL20. While following this rule, when the replacement of all the blocks in the n-th OTUk frame FR_n is performed, the last "16305:16320" block is arranged at the fifty-first column #51 in the twentieth logical lane LL20. Through the rearrangement, the n-th OTUk frame FR_n is converted into the data string formed of 20 logical lines each of which has 51 blocks.

Herein, as illustrated in FIG. 3, the OTUk frame has 4080 bytes×4=16320 bytes. Then, as this is set as blocks each having 16 bytes, the number of blocks for one OTUk frame is 1020 obtained by dividing 16320 by 16. In other words, the "16305:16320" block is the 1020-th block. Now, as the number of logical lanes is set as 20, the 1020-th block is arranged at the fifth-first column.

The description of FIG. 7 continues. With regard to the OTUk frame FR_n+1 located at the n+1-th, the "1:16 (FAS)" block at the beginning is arranged in a lane where the lane number at which the leading block in the one previous OTUk frame FR_n is increased by one, in other words, the first column #1 in the second logical lane LL2. The subsequent "17:32" block is arranged at the first column # in the third logical lane LL3, and then, in a similar manner, the "289:304" block is arranged at the first column #1 in the twentieth logical lane LL20. The subsequent "305:320" block is arranged at the first column #1 in the first logical lane LL1. When all the blocks at the first column # in the respective logical lanes LL1 to LL20, the processing of rearranging is shifted to the second column to the immediate right, and similarly as in the case of the above-mentioned column #1, after the following blocks are arranged in the order from the second column in the second logical lane LL2 to the second column in the twentieth logical lane LL20, the block is arranged at the second column in the first logical lane LL1. While following this rule, when all the blocks in the n+1-th OTUk frame FR_n+1 are rearranged, the last "16305:16320" block is arranged at the fifty-first column in the first logical lane LL1.

As described above, the rearrangement processing by the lane distribution part 142 from the OTUk frame in the logical lanes LL1 to LL20 is executed in the frame number order for the OTUk frames while following a rule in which after the rearrangement is ended for one OTUk frame, when the processing of rearranging is shifted to the rearrangement for the next OTUk frame, the logical lane where the "1:16 (FAS)" block at the beginning (shaded block in FIG. 7) is arranged is put forward by one, and the logical lane is rotated for every frame in this manner. In the example of FIG. 7, the leading block in the n+20-th OTUk frame FR_n+20 is arranged at the first column #1 in the twentieth logical lane LL20, and through the rearrangement from the n-th OTUk frame FR_n to the n+20-th OTUk frame FR_n+20, the lane rotation from the first logical lane LL1 to the twentieth logical lane LL20 goes around.

It may be noted that herein, the example of dividing the data stored in the OTUk frame into the 20 pieces of the logical lanes LL1 to LL20 for the parallel arrangement has been described, but the total number of the logical lanes (parallel number) may be appropriately set in accordance with the configuration and the operational speed of the signal processing circuit. If the total number of the logical lanes is increased, it is possible to perform the signal processing by using a circuit whose operational speed is relatively low. On the other hand, if the total number of the logical lanes is decreased, simplification of the circuit may be realized. For example, in the case of a system corresponding to the OTU3, it is regulated that the OTUk frame is divided in four logical lanes. In the OTU3, the optical signal at 40 Gbps is sent and received, and therefore the operational speed per logical lane is about 10 Gbps. Similarly to this, in the case of a system corresponding to the OTU4, in a case where the OTUk frame is divided in four logical lanes, in the OTU4, the optical signal at 100 Gbps is sent and received, the operational speed per logical lane is equal to or larger than 25 Gbps. Such a high speed circuit is not realistic at this moment, and it is therefore effective to increase the number of the logical lanes to restrain the operational speed per logical lane.

In connection with the above-mentioned system corresponding to the OTU3, in a case where the OTUk frame is divided in four logical lanes, by using lower two bits of the MFAS (see FIG. 3) contained in the overhead information in the OTUk frame, it is possible to identify in which logical lane the beginning of the data string in the OTUk frame is arranged among the four logical lanes. In other words, instead of the above-mentioned lane ID, the lower two bits of the existing MFAS may be utilized. However, the utilization of the lower two bits of the MFAS is limited to the case where the number of the logical lanes is four, and therefore the above-mentioned measures for increasing the total number of the logical lanes to restrain the operational speed per logical lane may not be adopted. A method of replacing a part of the FAS by the lane ID has an advantage that it is possible to correspond to the arbitrary number of logical lanes, which is extremely effective from the viewpoint of correspondence to the optical signal at an even higher speed.

For example, as illustrated in the lower right of FIG. 4, the optical transmitter 15 has an OTL processor interface 151, an encoding processor 152, a bit multiplex part 153, and an optical transmitting part 154.

To the encoding processor 152, the data strings in the respective logical lanes LL1 to LL20 output from the OTL processor 14 are input via the OTL processor interface 151, and the encoding processor 152 executes a necessary encoding processing corresponding to the multi-level modulation system for the optical signals transmitted to the transmission line 2 on the data strings. In a case where the transmission data need to be subjected to the scramble processing, the encoding processor 152 may also scramble the data strings in an area except for the FAS by using a previously determined scramble code.

The bit multiplex part 153 multiplexes the above-mentioned data strings in the respective logical lanes LL1 to LL20 processed by the encoding processor 152 while corresponding to the multi-level modulation system for the optical signals transmitted to the transmission line 2. For example, in a case where the above-mentioned multi-level modulation system for the optical signals is DP-QPSK (Dual Polarization-Quadrature Phase Shift Keying) system in which phase modulation of 2 bits (4 values) and polarization multiplex are combined, an In-phase (I) component and a Quadrature-phase (Q) component in the 4-value phase modulation are respectively transmitted by an X-polarized wave and a Y-polarized wave. For this reason, the bit multiplex part 153 multiplexes the data strings in the respective logical lanes LL1 to LL20 into four types of data strings to generate a data signal X_I corresponding to the I component of the X-polarized wave, a data signal X_Q corresponding to the Q component of the X-polarized wave, a data signal Y_I corresponding to the I component of the Y-polarized wave, and a data signal Y_Q corresponding to the Q component of the Y-polarized wave.

FIG. 8 is a diagram illustrating an example of a method of multiplexing the data strings in the respective logical lanes LL1 to LL20 in four types of data strings. In this example of FIG. 8, the data strings in the logical lanes LL1 to LL5 are multiplied into one to generate the data signal X_I corresponding to the I component of the X-polarized wave, and the data strings in the logical lanes LL6 to LL10 are multiplied into one to generate the data signal X_Q corresponding to the Q component of the X-polarized wave. Also, the data strings in the logical lanes LL11 to LL15 are multiplied into one to generate the data signal Y_I corresponding to the I component of the Y-polarized wave, and the data strings in the logical lanes LL16 to LL20 are multiplied into one to generate the data signal Y_Q corresponding to the Q component of the Y-polarized wave. Such a multiplex method corresponds to OTL4.4 regulated by ITU-T.

FIG. 9 is a diagram illustrating another example of the method of multiplexing the data strings in the respective logical lanes LL1 to LL20 in four types of data strings. In this example of FIG. 9, first, adjacent two each of the 20 logical lanes LL1 to LL20 are multiplexed. Then, ten pieces of data strings of the logical lanes are allocated in four types of the data strings from the front in the order to generate data signals respectively corresponding to the I and Q components of the X-polarized wave and the I and Q components of the Y-polarized wave. Such a two-stage multiplex method corresponds to bit multiplex in GearBox regulated by IEEE (The Institute of Electrical and Electronics Engineers, Inc.) 100 GbE. It may be noted that the multiplex method for the respective logical lanes are not limited to the examples of FIG. 8 and FIG. 9, and it is possible to adopt an arbitrary multiplex method corresponding to an applied multi-level modulation method.

The optical transmitting part 154 generates the optical signals by using the respective data signals output from the bit multiplex part 153, based on the multi-level modulation system, and transmits the optical signals to the transmission line 2.

Figure 10:
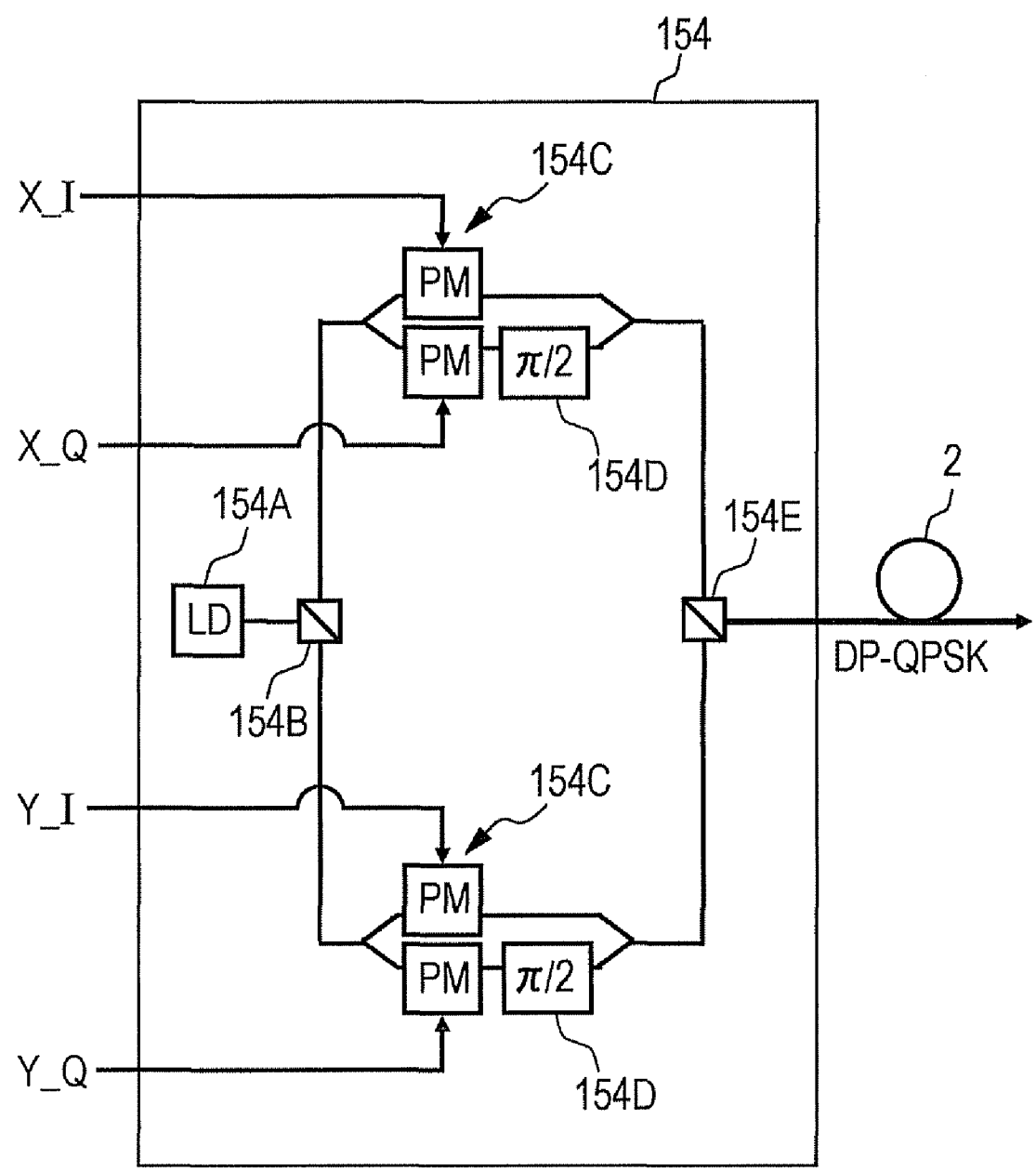
FIG. 10 is a block diagram illustrating a configuration example of an optical transmitting part corresponding to a DP-QPSK system according to the above-mentioned embodiment.

FIG. 10 is a block diagram illustrating a configuration example of the optical transmitting part 154 corresponding to the DP-QPSK system. In the configuration example of FIG. 10, the optical transmitting part 154 includes a light source (LD) 154A, a polarized wave separator 154B, four phase modulators (PM) 154C, two phase shifters 154D, and the polarized wave combiner 154E. In the optical transmitting part 154, light output from the light source 154A is separated by the polarized wave separator 154B into an orthogonal polarized wave component, and the respective lights of the X-polarized wave and the Y-polarized wave are further branched into two to be respectively provided to the four phase modulators 154C. The lights input to the respective phase modulators 154C are respectively subjected to phase modulation while following the respective data signals X_I, X_Q, Y_I, and Y_Q output from the bit multiplex part 153. After the phase of one light among a pair of the lights corresponding to the respective polarized waves is shifted by π/2 by the phase shifter 154D, the light subjected to the phase modulation by the respective phase modulators 154C is combined with the other light, and further, the lights of the respective polarized waves are combined by the polarized wave combiner 154E. With this configuration, the optical signals based on the DP-QPSK system are transmitted from the optical transmitting part 154 to the transmission line 2.

It may be noted that herein, as the specific configuration example of the optical transmitting part 154, the case of the DP-QPSK system has been illustrated, but the configuration of the optical transmitting part 154 is not limited to the above, and a known configuration corresponding to the multi-level modulation system for the optical signals transmitted to the transmission line 2 may be applied.

The reception unit 1B (FIG. 2) has, for example, an optical receiver 21 functioning as optical reception means, an OTL processor 22 functioning as frame regeneration means, an OTUk frame processor 23, a client signal processor 24, and a plurality of client signal transmitters 25. Each processor of the OTL processor 22, the OTUk frame processor 23, and the client signal processor 24 does not have the necessity for being an individual processor and may be put into practice by using a common processor.

Figure 11:
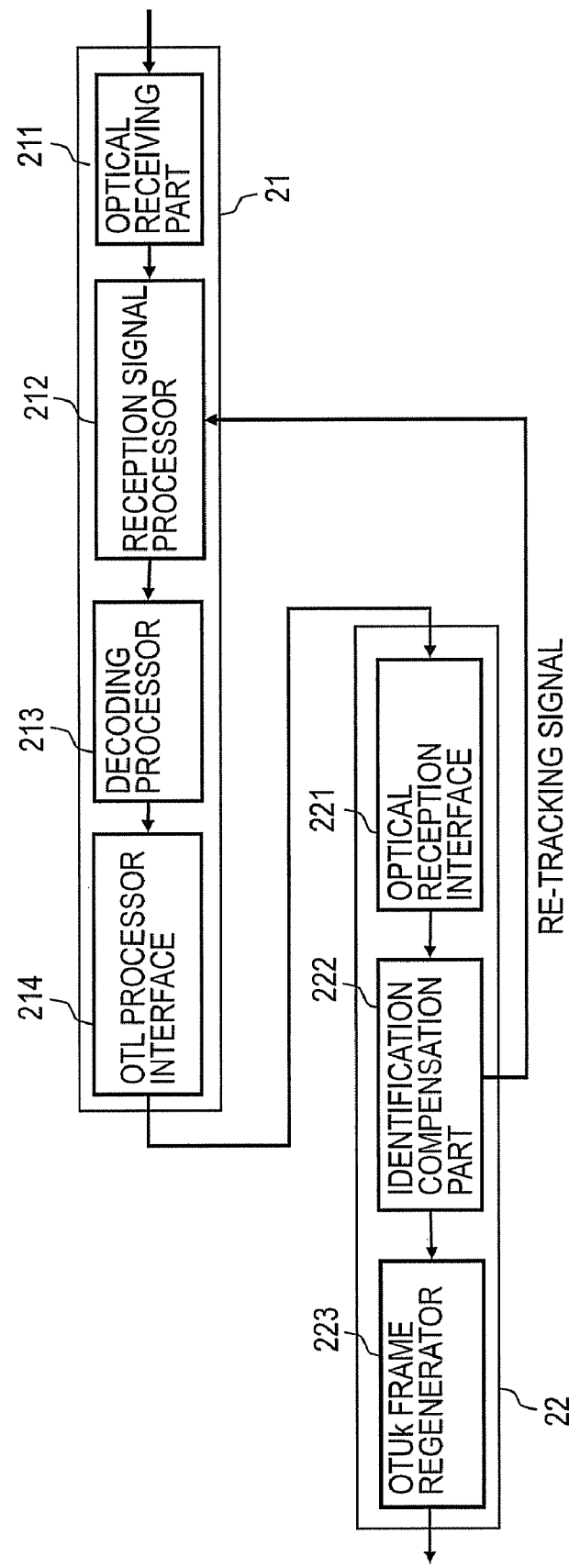
FIG. 11 is a block diagram illustrating configuration examples of an optical receiver and an OTL processor in a reception unit according to the above-mentioned embodiment.

As illustrated in the upper right of FIG. 11, the optical receiver 21 has, for example, an optical receiving part 211, a reception signal processor 212, a decoding processor 213, and an OTL processor interface 214. To the optical receiving part 211, the optical signal transmitted through the transmission line 2 is input, and the optical receiving part 211 converts the optical signal into an electric signal to be output to the reception signal processor 212.

Figure 12:
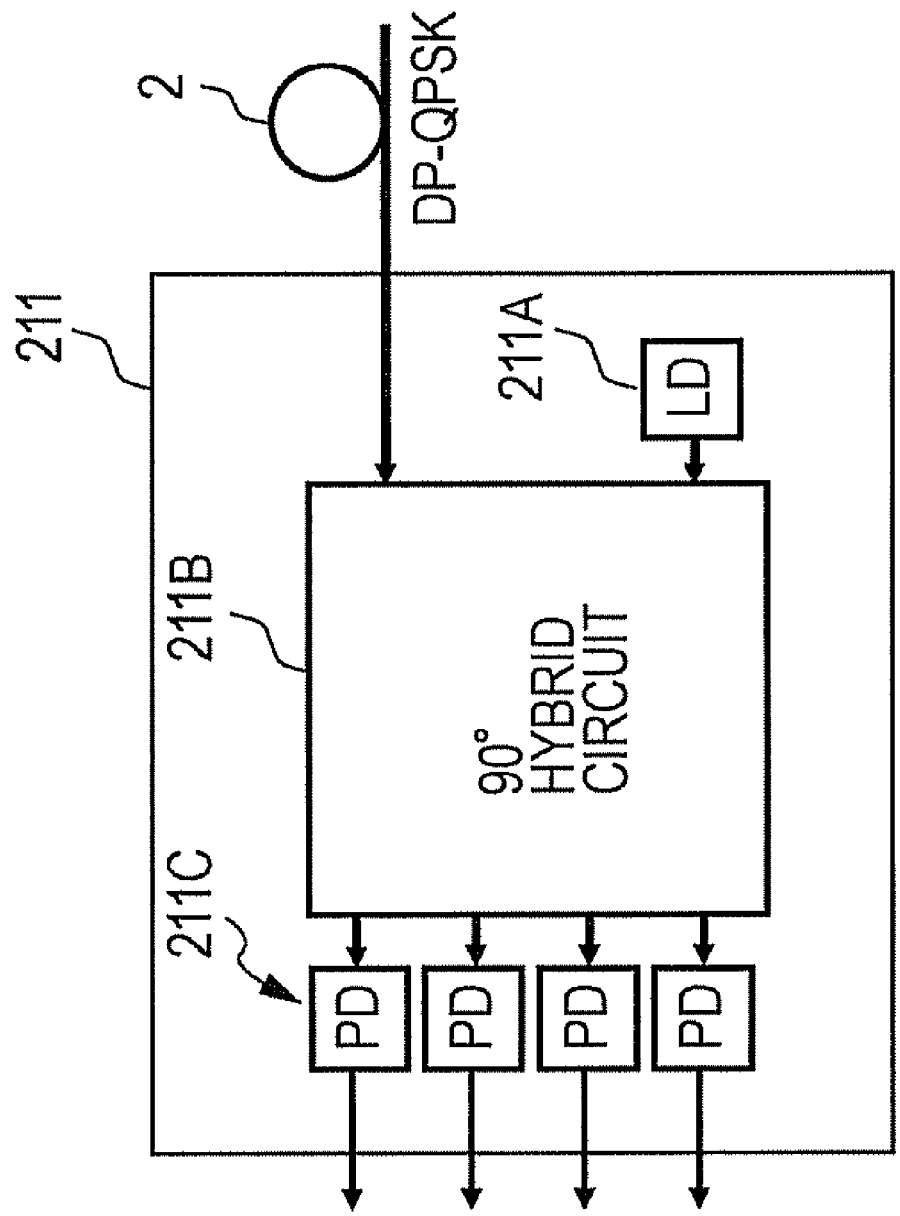
FIG. 12 is a block diagram illustrating a configuration example of an optical receiver corresponding to the DP-QPSK system according to the above-mentioned embodiment.

FIG. 12 is a block diagram illustrating a configuration example of the optical receiving part 211 corresponding to the DP-QPSK system. In the configuration example of FIG. 12, the optical receiving part 211 includes a local oscillation light source (LD) 211A, a 90° hybrid circuit 211B, and four photo detectors (PD) 211C. In the optical receiving part 211, the optical signal from the transmission line 2 and the local oscillation light output from the local oscillation light source 211A are provided to the 90° hybrid circuit 211B, and the respective output lights from the 90° hybrid circuit 211B are converted to electric signals by the respective photo detectors 211C to be sent to the reception signal processor 212. The reception signal processor 212 processes the output signal from the optical receiving part 211 to perform the identification processing respectively on the data corresponding to the respective I and Q components of the X-polarized wave and the Y-polarized wave of the received optical signal.

Figure 13:
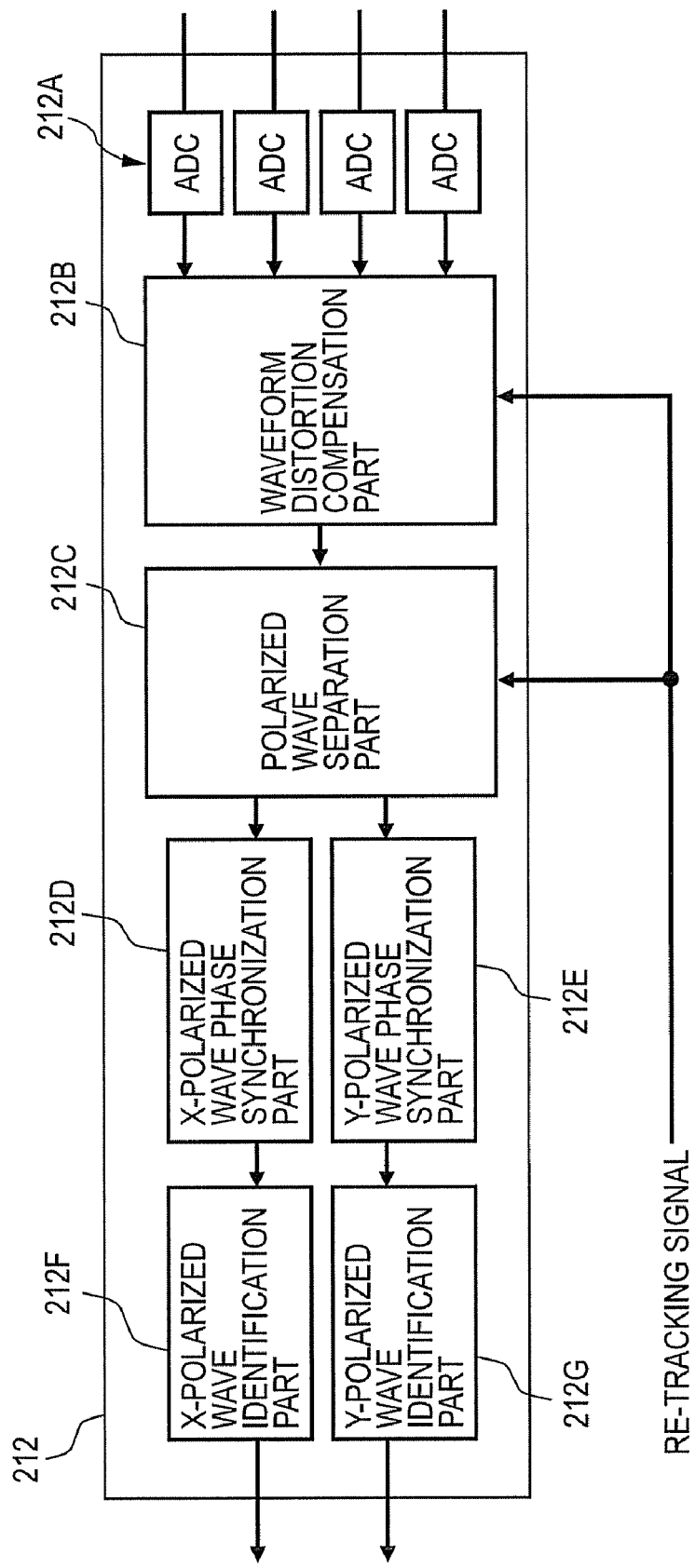
FIG. 13 is a block diagram illustrating a configuration example of a reception signal processor corresponding to the DP-QPSK system according to the above-mentioned embodiment.

FIG. 13 is a functional block illustrating a configuration example of the reception signal processor 212 corresponding to the DP-QPSK system. In the configuration example of FIG. 13, the reception signal processor 212 has four AD converters (ADC) 212A, a waveform distortion compensation part 212B, the polarized wave separation part 212C, an X-polarized wave phase synchronization part 212D, a Y-polarized wave phase synchronization part 212E, an X-polarized wave identification part 212F, and a Y-polarized wave identification part 212G.

In the reception signal processor 212, the respective output signals from the optical receiving part 211 are AD-converted by the respective AD converters 212A and thereafter sequentially supplied to the waveform distortion compensation part 212B and the polarized wave separation part 212C. Through a signal processing by using a necessary digital filter or the like, compensation for a waveform distortion of the reception signal caused from a wavelength dispersion, a polarization mode dispersion, a nonlinear effect, or the like in the transmission line 2 is performed. The components corresponding to the X-polarized wave and the Y-polarized wave of the relevant reception signal are separated. The digital signal processing in the waveform distortion compensation part 212B and the polarized wave separation part 212C includes receiving re-tracking signal output from the OTL processor 22 which will be described below and changing a setting of a coefficient of a digital filter and the like. Then, synchronization of the I and Q components of the X-polarized wave and the I and Q components of the Y-polarized wave is established in the respective phase synchronization parts 212D and 212E for the X-polarized wave and the Y-polarized wave, and the identification processing on the data corresponding to the respective components are executed in the respective identification parts 212F and 212G for the X-polarized wave and the Y-polarized wave. Reception data indicating the identification results in the identification parts 212F and 212G is sent to the decoding processor 213 (FIG. 11).

The decoding processor 213 uses the respective pieces of reception data of the X-polarized wave and the Y-polarized wave output from the reception signal processor 212 to perform a decoding processing corresponding to the DP-QPSK system, so that data strings respectively corresponding to the respective I and Q components of the X-polarized wave and the Y-polarized wave of the received optical signal are generated. Also, the decoding processor 213 divides the decoded four data strings into data strings corresponding to the same number of the first to twentieth physical lanes PL1 to PL20 as the logical lanes at the time of the frame division on the transmission side. The respective physical lanes PL1 to PL20 are physical lanes decided on the basis of a circuit structure of the decoding processor 213. The above-mentioned data strings of the respective physical lanes PL1 to PL20 are output via the OTL processor interface 214 to the OTL processor 22.

As described above, in the optical transmission system adopting the multi-level modulation method, while depending on the operational environment of the system, the bit inversion and replacement in one symbol time may be generated, and a case may occur that a state of the signal decoded on the reception side is different from that of the original signal at the time of the transmission. For this reason, the above-mentioned data strings of the respective physical lanes PL1 to PL20 output from the optical receiver 21 to the OTL processor 22 are not always matched with the data strings in the respective logical lanes LL1 to LL20 at the time of the transmission. This situation will be described in detail while it is supposed that the optical signal based on the DP-QPSK system is transmitted similarly as in the above-mentioned example.

FIG. 14 is a diagram illustrating a transmission state of one symbol for the optical signal based on the DP-QPSK system and a reception state in a case where the relevant optical signal is normally transmitted without the bit inversion and replacement as an example. In a transmission state in the upper stage of FIG. 14, the X-polarized wave (or the Y-polarized wave) of the optical signal takes four states A to D on the basis of the phases of the I and Q components. The state A corresponds to a direction at 45° with respect to an axis I represented by a solid line arrow in the drawing where the phases of the I and Q components both indicate 0. The state B corresponds to a direction at 135° where the phase of the I component indicates 1, and the phase of the Q component indicates 0. The state C corresponds to a direction at 225° where the phases of the I and Q components both indicate 1. The state D corresponds to a direction at 315° where the phase of the I component indicates 0, and the phase of the Q component indicates 1. In a normal reception state of the lower stage of FIG. 14, the relations of an axis $I_R$ and an axis $Q_R$ at the time of the reception represented by solid line arrows in the drawing and an axis $I_T$ and an axis $Q_T$ at the time of the transmission represented by broken line arrows in the drawing are matched, and the four states A to D at the time of the reception and the transmission are the same.

In contrast to FIG. 14 mentioned above, FIG. 15 is a diagram illustrating a reception state in a case where the bit inversion and replacement are generated as an example. A reception state in the upper stage of FIG. 15 is in a relation where the axis $I_T$ and the axis $Q_T$ at the time of the transmission are rotated anti-clockwise by 90° at with respect to the axis $I_R$ and the axis $Q_R$ at the time of the reception, that is, in a relation where the axis $I_T$ and the axis $Q_T$ at the time of the transmission are swapped, and also the direction of the axis $Q_T$ is inversed. For this reason, four states α to δ at the time of the reception are different from the four states A to D at the time of the transmission. When data corresponding to the I and Q components at the time of the transmission is represented by (I, Q), the decode state at the time of the reception becomes (Q', I). It may be however noted that Q' represents a value in which Q is subjected to the logic inversion, and hereinafter, the logic inversion value is represented in a similar method.

A reception state illustrated in the middle stage of FIG. 15 is in a relation where the axis $I_T$ and the axis $Q_T$ at the time of the transmission are rotated anti-clockwise by 180° with respect to the axis $I_R$ and the axis $Q_R$ at the time of the reception, that is, in a relation where the directions of the axis $I_T$ and the axis $Q_T$ at the time of the transmission are both inversed. For this reason, the four states α to δ at the time of the reception are different from the four states A to D at the time of the transmission, and the decode state at the time of the reception becomes (I', Q'). Also, a reception state illustrated in the lower stage of FIG. 15 is in a relation where the axis $I_T$ and the axis $Q_T$ at the time of the transmission are rotated anti-clockwise by 270° with respect to the axis $I_R$ and the axis $Q_R$ at the time of the reception, that is, in a relation where the axis $I_T$ and the axis $Q_T$ at the time of the transmission are swapped, and also the direction of the axis $I_T$ is inversed. For this reason, the four states α to δ at the time of the reception are different from the four states A to D at the time of the transmission, and the decode state at the time of the reception becomes (Q, I').

The above-mentioned change in the reception state is generated because of the bias points of the phase modulator 154C in the optical transmitting part 154, the optical path length difference between the polarized wave separator 1546 and the polarized wave combiner 154E, the polarization mode dispersion, the non-linear phase noise in the transmission line 2, the optical path length difference of inter-polarized waves in the optical receiving part 211, the phase fluctuation of the local oscillation light source 211A, or the replacement of the polarized wave channels (the X-polarized wave, the Y-polarized wave) at the time of the reception, or the like. FIG. 16 is a diagram collectively illustrating combinations of reception states that may be generated at the time of transmission of the optical signal based on the DP-QPSK system. In this manner, for the respective I and Q components of the X-polarized wave and the Y-polarized wave, 32 reception states are supposed on the basis of the bit inversion and replacement.

For example, as illustrated in the lower left of FIG. 11, the OTL processor 22 has an optical reception interface 221, an identification compensation part 222, and an OTUk frame regenerator 223. The data strings of the respective physical lanes PL1 to PL20 output from the optical receiver 21 are provided via the optical reception interface 221 to the identification compensation part 222.

The identification compensation part 222 detects FAS for the data strings of the respective physical lanes PL1 to PL20, identifies a lane ID contained in the FAS, and determines the bit inversion and replacement on the basis of the lane ID to perform the compensation thereof.

Figure 17:
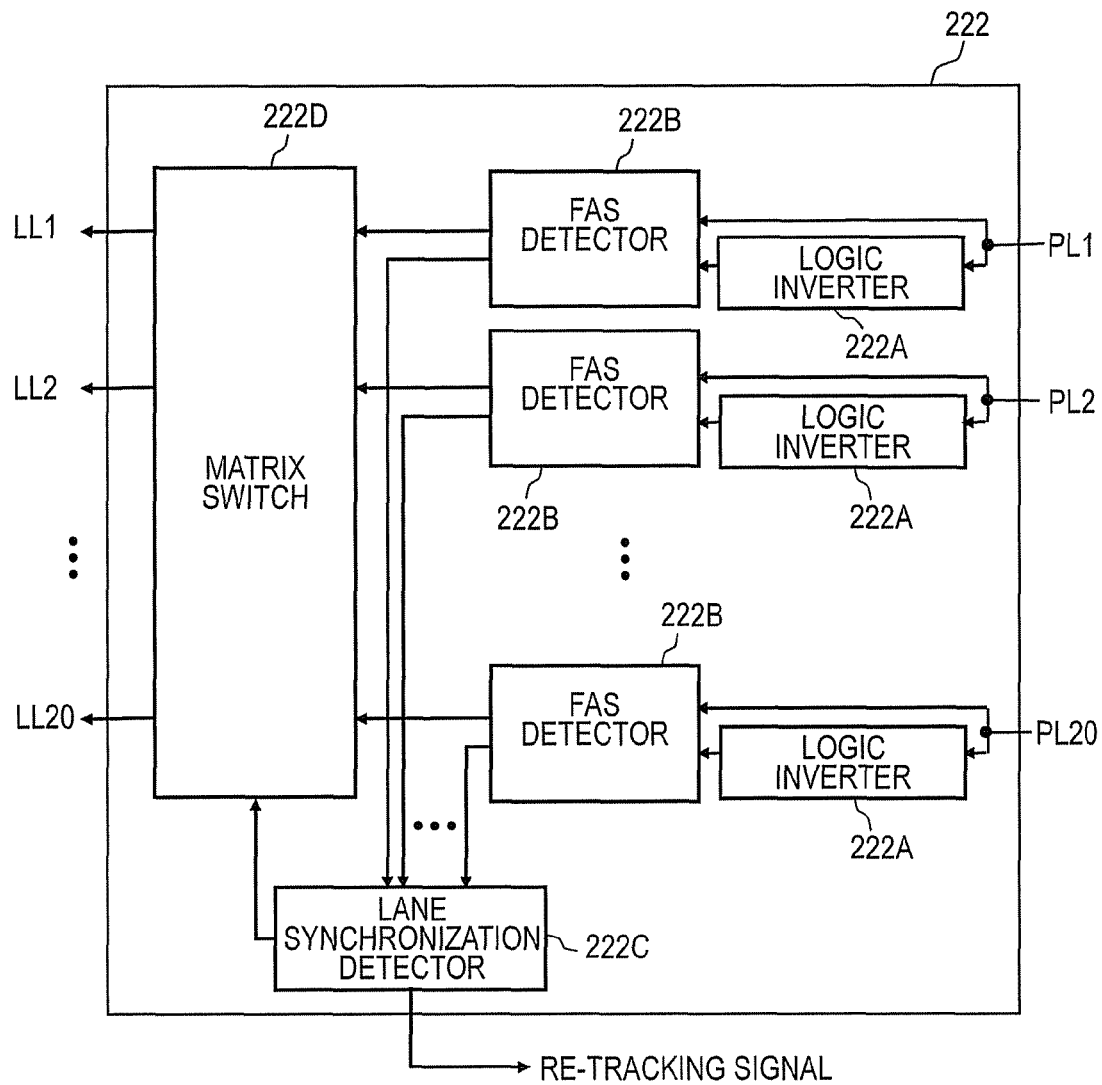
FIG. 17 is a block diagram illustrating a configuration example of an identification compensation part according to the above-mentioned embodiment.

FIG. 17 is a block diagram illustrating an example of a specific circuit structure of the identification compensation part 222. In FIG. 17, the identification compensation part 222 has a logic inverter 222A and an FAS detector 222B for each of the data strings of the respective physical lanes PL1 to PL20. The logic inverter 222A performs logic inversion on the data string in the corresponding physical lane to be output to the FAS detector 222B. To the FAS detector 222B, the data string in the corresponding physical lane and the data string subjected to the logic inversion by the logic inverter 222A are input. The FAS detector 222B detects the FAS for each of the data strings and identifies the lane ID set at a predetermined position of the relevant FAS (in the above-mentioned example of FIG. 5, at the sixth-byte). The FAS detector 222B informs a lane synchronization detector 222C of the identification results of the lane ID and also outputs the data string whose FAS is detected among the input non-inverted or inverted data strings to a matrix switch 222D.

On the basis of the identification results of the lane ID in the respective FAS detectors 222B, the lane synchronization detector 222C creates a correspondence table of the physical lane and the logical lane which will be described below, determines the physical lane where the order replacement of the logical lanes at the time of the transmission is generated, and produces a control signal for switching the logical lanes in the matrix switch 222D so as to compensate the above-mentioned replacement. Also, the lane synchronization detector 222C outputs a signal requesting re-tracking with respect to the reception signal processor 212 in a case where the lane ID may not be correctly identified in the respective FAS detectors 222B or a case where overlapping of the logical lanes is generated in the created correspondence table.

The matrix switch 222D has input ports corresponding to the number of the physical lanes (herein, 20 lanes) and the same number of output ports as the input ports, and a connection between the input and output ports is switched while following the control signal from the lane synchronization detector 222C.

The OTUk frame regenerator 223 (FIG. 11) rearranges the data strings in the respective logical lanes LL1 to LL20 in which the bit inversion and the lane replacement is compensated which are output from the identification compensation part 222 for every 16 bytes as opposite to the OTL processing on the transmission side and restores the bytes of the FAS replaced by the lane ID so as to reproduce the OTUk frame. This OTUk frame reproduced by the OTUk frame regenerator 223 is output to the OTUk frame processor 23 (FIG. 2), and a client signal is generated while following the overhead information in the OTUk frame. The client signal is transmitted via the client signal processor 24 and the client signal transmitter 25 to the corresponding client apparatus CL.

Herein, an example of the above-mentioned specific processing in the identification compensation part 222 will be described in detail with reference to a flow chart of FIG. 18.

At the time of start-up of the system or in a necessary processing cycle in operation, when the data strings of the respective physical lanes PL1 to PL20 are provided to the identification compensation part 222, a FAS detection processing is started in the FAS detectors 222B corresponding to the respective physical lanes PL1 to PL20. In the FAS detection processing in each of the FAS detectors 222B (S10 in FIG. 18), the FAS is detected with respect to the data string of the physical lane, and whether or not the lane ID is identified through the detection of the FAS is determined (S11). Also, in parallel to this, with respect to the data string subjected to the logic inversion by the logic inverter 222A too, the FAS detection is performed, whether or not the lane ID is identified through the detection of the FAS (S12, S13). In the above-mentioned case of the FAS illustrated in FIG. 5, the detection pattern for the FAS is "OA1, OA1, OA1, OA2, OA2, the lane ID", and the actual data is "F6, F6, F6, 28, 28, xx". It may be noted that "xx" takes a different value for each lane ID. This pattern appears in the respective physical lanes PL1 to PL20 with a cycle of 4080×4 bytes.

When the lane ID is identified with respect to one of the data string which is not subjected to the logic inversion by the logic inverter 222A and the data string subjected to the logic inversion, the identification result is sent to the lane synchronization detector 222C. At this time, the data string whose lane ID is identified among the above-mentioned two types of the data strings is selectively output to the matrix switch 222D. With this configuration, in accordance with the operational environment of the system, the bit inversion generated in the reception data is compensated.

On the other hand, in a case where the lane ID is not identified in the necessary cycle with respect to both of the above-mentioned two types of the data strings, a detection abnormality in the reception signal processor 212 is determined, and that effect is sent from the FAS detector 222B to the lane synchronization detector 222C (S14, S15). When the detection abnormality is determined in any of the FAS detectors 222B corresponding to the respective physical lanes PL1 to PL20, the lane synchronization detector 222C generates a re-tracking signal for instructing the reception signal processor 212 to perform an optimization in the processing in the waveform distortion compensation part 212B (FIG. 13) (to be more specific, a review of the coefficient or the like in the digital filter) (S90). In the reception signal processor 212, in response to the re-tracking signal from the lane synchronization detector 222C, the optimization of the waveform distortion compensation part 212B is performed, and the FAS detection processing in the respective FAS detectors 222B is carried out again (S120).

It may be noted that herein, the example has been illustrated in which the logic inverters 222A are provided while respectively corresponding to the respective physical lanes PL1 to PL20, and the FAS detection is performed with respect to the data string subjected to the logic inversion by the logic inverter 222A and the data string which is not subjected to the logic inversion, but it is also possible that the respective logic inverters 222A are omitted, and FAS detection is performed. In this case, as the detection pattern for the FAS, in addition to the above-mentioned first detection pattern "F6, F6, F6, 28, 28, xx", the respective FAS detectors 222B prepares a second detection pattern "09, 09, 09, D7, D7, yy" which is obtained by subjecting the first detection pattern to the logic inversion and performs the FAS detection by using the two detection patterns. Then, in a case where the FAS is detected with is matched with the first detection pattern, the respective FAS detectors 222B outputs the relevant data string to the matrix switch 222D as it is, and in a case where the FAS is detected with is matched with the second detection pattern, the respective FAS detectors 222B outputs the relevant data string subjected to the logic inversion to the matrix switch 222D.

When the lane ID is identified in the FAS detector 222B corresponding to all the physical lanes PL1 to PL20, each of the identification results is sent to the lane synchronization detector 222C, the lane synchronization detector 222C creates a correspondence table for the physical lane and the logical lane (S20). With regard to a correspondence relation between the physical lane and the logical lane, from the identification result of the lane ID, it is possible to find out at which logical lane the relevant FAS is arranged among the 20 logical lanes LL1 to LL20 at the time of the transmission, and the logical lane is associated with the physical lane on the reception side.

Figure 19:
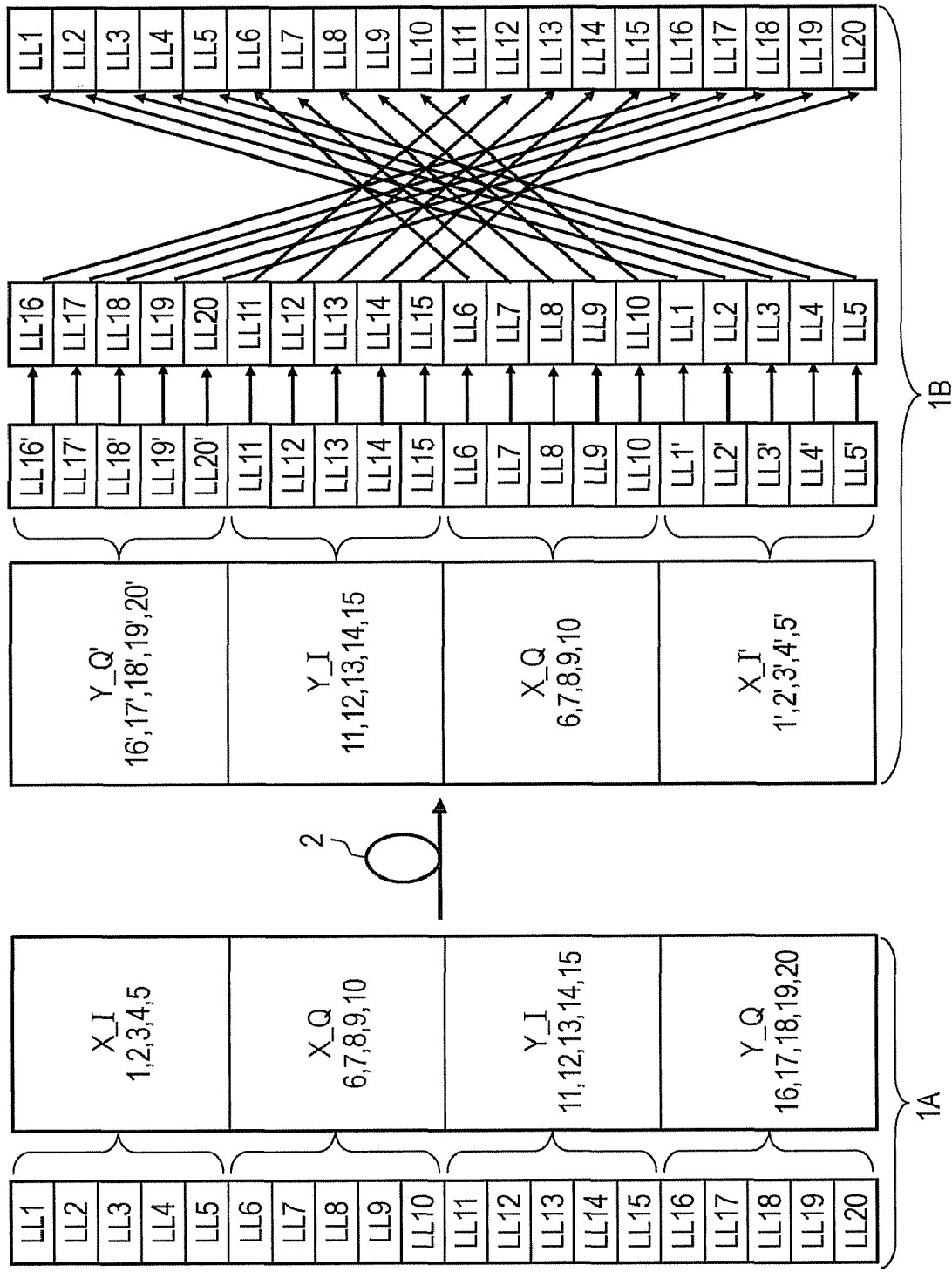
FIG. 19 is a diagram illustrating examples of the bit inversion and the lane replacement in the multiplex method of FIG. 8.

FIG. 19 is a diagram collectively illustrating states of the bit inversion and the lane replacement in a certain operational environment of the system. This example of FIG. 19 corresponds to a case where the data strings in the respective logical lanes LL1 to LL20 are multiplexed at 5:1 on the above-mentioned transmission side of FIG. 8. Through the transmission of the optical signal based on the DP-QPSK system, the respective data signals X_I and X_Q corresponding to the I component and the Q component of the X-polarized wave are replaced by the respective data signals Y_Q and Y_I corresponding to the I component and the Q component of the Y-polarized wave, and also the bit inversion is generated in the I component of the X-polarized wave and the Q component of the Y-polarized wave to obtains data signals X_I' and Y_Q'.

FIG. 20 is a diagram illustrating a correspondence table for the physical lane and the logical lane created in the lane synchronization detector 222C in the above-mentioned situation of FIG. 19. For example, the physical lane PL1 is equivalent to a logical lane LL16' included in the data signal Y_Q' corresponding to the Q component of the Y-polarized wave subjected to the bit inversion, and the lane ID is identified on the data string which passes through the logic inverter 222A. Thus, in the correspondence table of FIG. 20, the logical lane LL is 16, and the logic inversion is on. Also for example, the physical lane PL6 is equivalent to the logical lane LL11 included in the data signal Y_I corresponding to the I component of the Y-polarized wave, and the lane ID is identified on the data string which does not pass through the logic inverter 222A. Thus, in the correspondence table of FIG. 20, the logical lane LL is 11, and the logic inversion is off.

Figure 21:
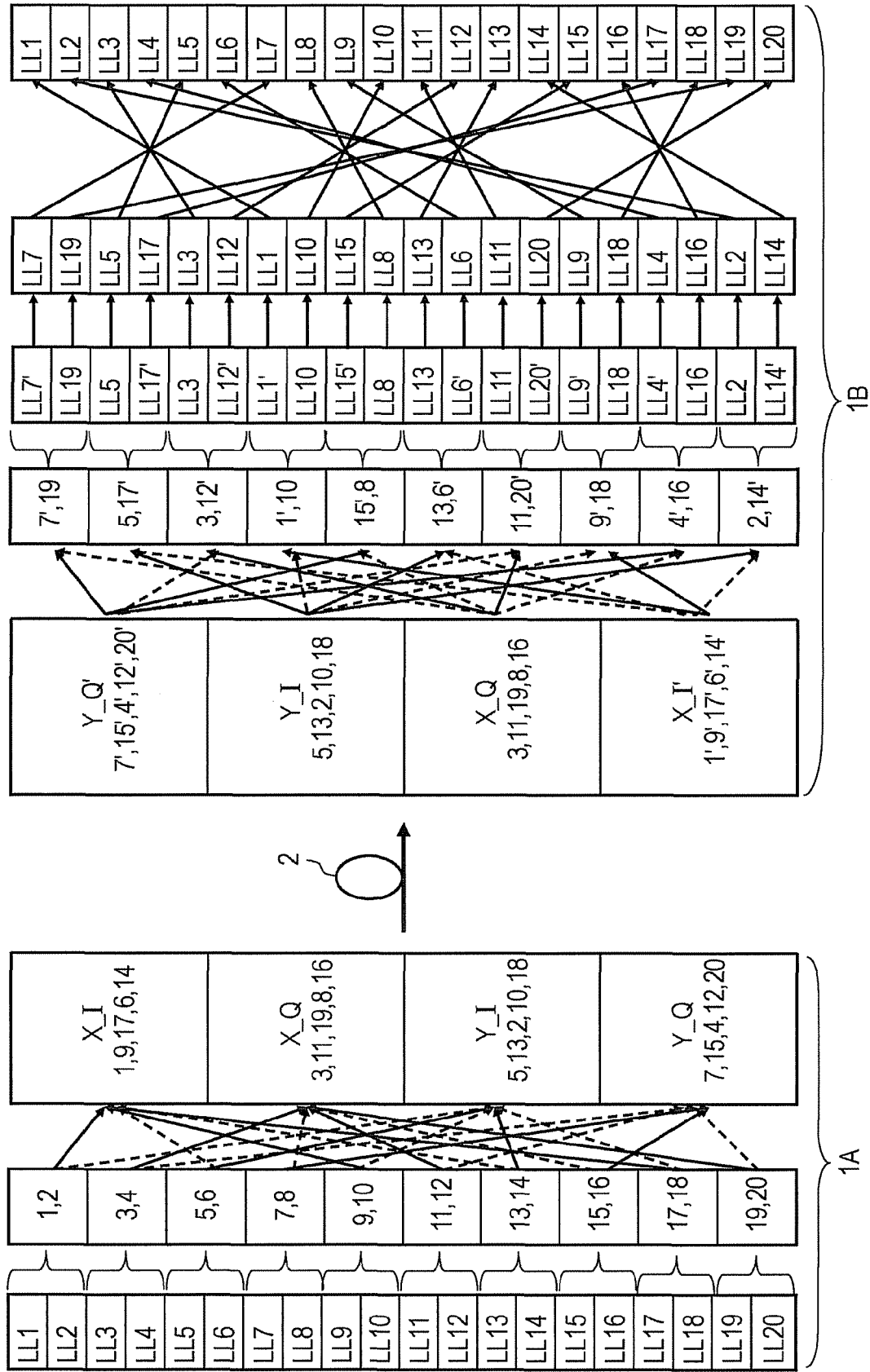
FIG. 21 is a diagram illustrating examples of the bit inversion and the lane replacement in the multiplex method of FIG. 9.

As examples different from the above-mentioned examples in FIG. 19 and FIG. 20, FIG. 21 and FIG. 22 are diagrams illustrating cases in which the data strings in the respective logical lanes LL1 to LL20 are multiplexed at 2:1 and then multiplexed at 10:4 on the above-mentioned transmission side illustrated in FIG. 9. In this case too, as illustrated in FIG. 21, through the transmission of the optical signal based on the DP-QPSK system, the respective data signals X_I and X_Q corresponding to the I component and the Q component of the X-polarized wave are replaced by the respective data signals Y_Q and Y_I corresponding to the I component and the Q component of the Y-polarized wave, and also the bit inversion is generated in the I component of the X-polarized wave and the Q component of the Y-polarized wave to obtain the data signals X_I' and Y_Q'. In this situation, for example, the physical lane PL1 is equivalent to a logical lane LL7' included in the data signal Y_Q' corresponding to the Q component of the Y-polarized wave subjected to the bit inversion, and the lane ID is identified on the data string which passes through the logic inverter 222A. Thus, in the correspondence table of FIG. 22, the logical lane LL is 7, and the logic inversion is on. Also, the physical lane PL2 is equivalent to the logical lane LL19 included in the data signal X_Q corresponding to the Q component of the X-polarized wave, and the lane ID is identified on the data string which does not pass through the logic inverter 222A. Thus, in the correspondence table of FIG. 22, the logical lane LL is 19, and the logic inversion is off.

Figure 18:
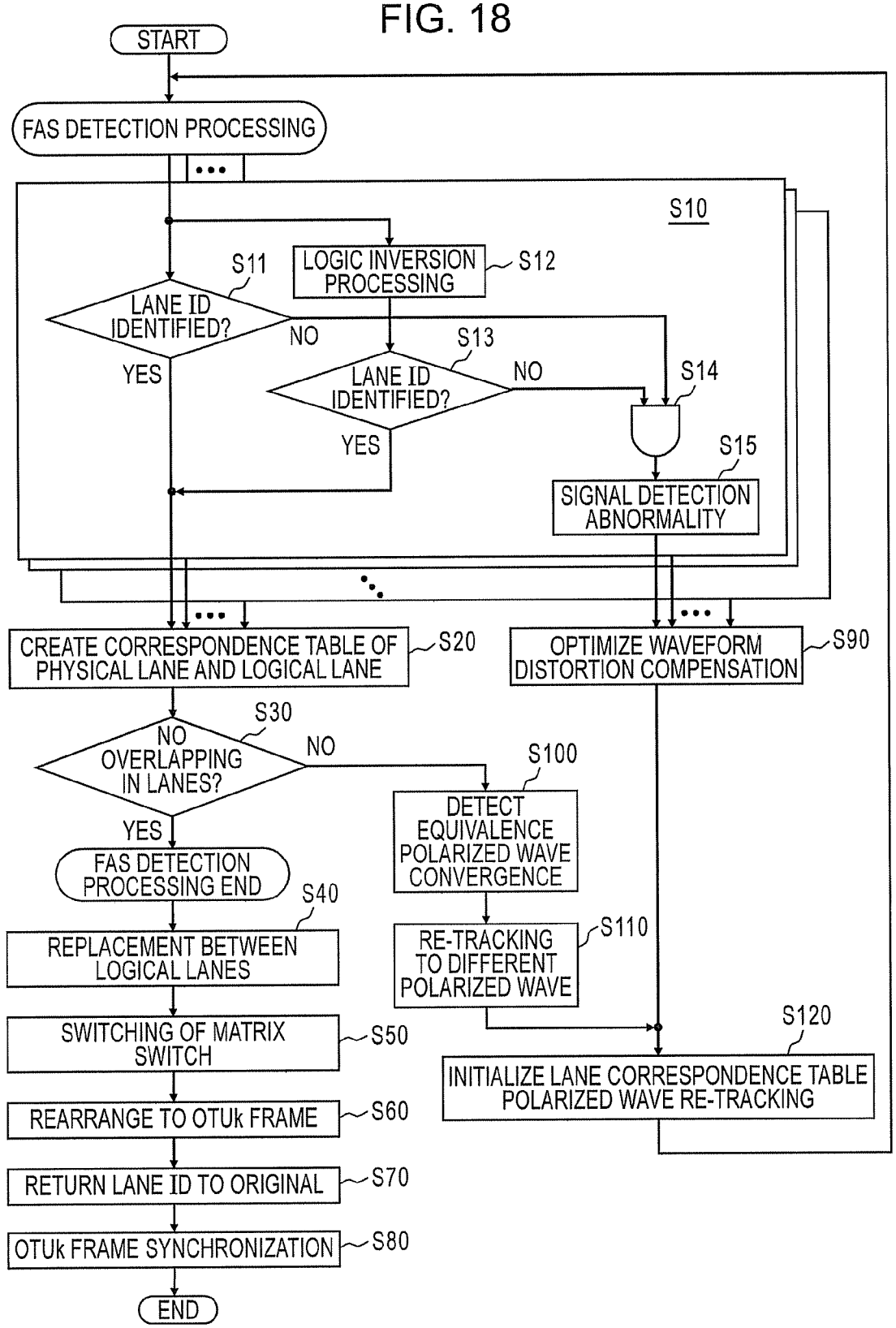
FIG. 18 is a flow chart illustrating an example of a specific processing in the identification compensation part according to the above-mentioned embodiment.

When the correspondence table for the physical lane and the logical lane is created in the above-mentioned manner, the lane synchronization detector 222C determines whether or not overlapping of the logical lanes in the correspondence table is generated (S30 in FIG. 18). The overlapping of the logical lanes may be generated in a case where the data having the same polarized wave component is set as data having different polarized wave components (equivalence polarized wave convergence) in a processing of the polarized wave separation part 212C (FIG. 13) in the reception signal processor 212. For this reason, when the overlapping of the logical lanes is determined, the lane synchronization detector 222C detects the equivalence polarized wave convergence and generates a re-tracking signal for instructing the reception signal processor 212 to perform a re-tracking processing to a different polarized wave state (S100, S110). In the reception signal processor 212 receiving this re-tracking signal, the polarized wave separation part 212C is optimized, and after initializing the above-mentioned correspondence table, the FAS detection processing in the respective FAS detectors 222B is performed again (S120).

On the other hand, when no overlapping of the logical lanes is determined, the lane synchronization detector 222C ends the FAS detection processing corresponding to the respective physical lanes PL1 to PL20 and generates a control signal for instructing the matrix switch 222D to perform the replacement between the logical lanes different from the state at the time of the transmission while referring to the above-mentioned correspondence table for the physical lane and the logical lane (S40). As the connection state between the input and output ports of the matrix switch 222D is switched on the basis of this control signal (S50), the data strings arranged in the same logical lanes LL1 to LL20 at the time of the transmission (see the right ends of FIG. 19 and FIG. 21) are output from the matrix switch 222D to the OTUk frame regenerator 223.

In the OTUk frame regenerator 223, the data strings in the respective logical lanes LL1 to LL20 are rearranged for every 16 bytes while following an inverse procedure to the OTL processing on the transmission side (S60), and also the FAS byte replaced by the lane ID is returned to the original (S70). With this configuration, the synchronization of the OTUk frame is checked (S80), and the data signal stored in the OTUk frame is output to the OTUk frame processor 23.

As described above, according to the optical transmission system of the present embodiment, the data stored in the OTUk frame is rearranged in the plurality of logical lanes to realize the increase in the speed for the signal processing through the frame division, and also the lane ID with which it is possible to identify at which logical lane the beginning of the data string in the OTUk frame is arranged among the plurality of logical lanes is set in a part of the FAS to perform the transmission of the optical signal based on the multi-level modulation system. Therefore, the bit inversion and the lane replacement generated in the reception data depending on the operational environment of the system may be detected at an early stage by utilizing the above-mentioned lane ID and surely compensated.

It may be noted that according to the above-mentioned embodiment, the description has been provided while taking the example of the DP-QPSK system as the multi-level modulation method, but the present embodiment is not limited to the above. The present embodiment may be also applied to a multi-value phase modulation system without using a polarization multiplex (for example, 8PSK system), a Quadrature Amplitude Modulation (QAM) system of performing multi-level quadrature amplitude modulation through the combination of the phase and the amplitude (for example, 16 QAM system), and the like.

Figure 23:
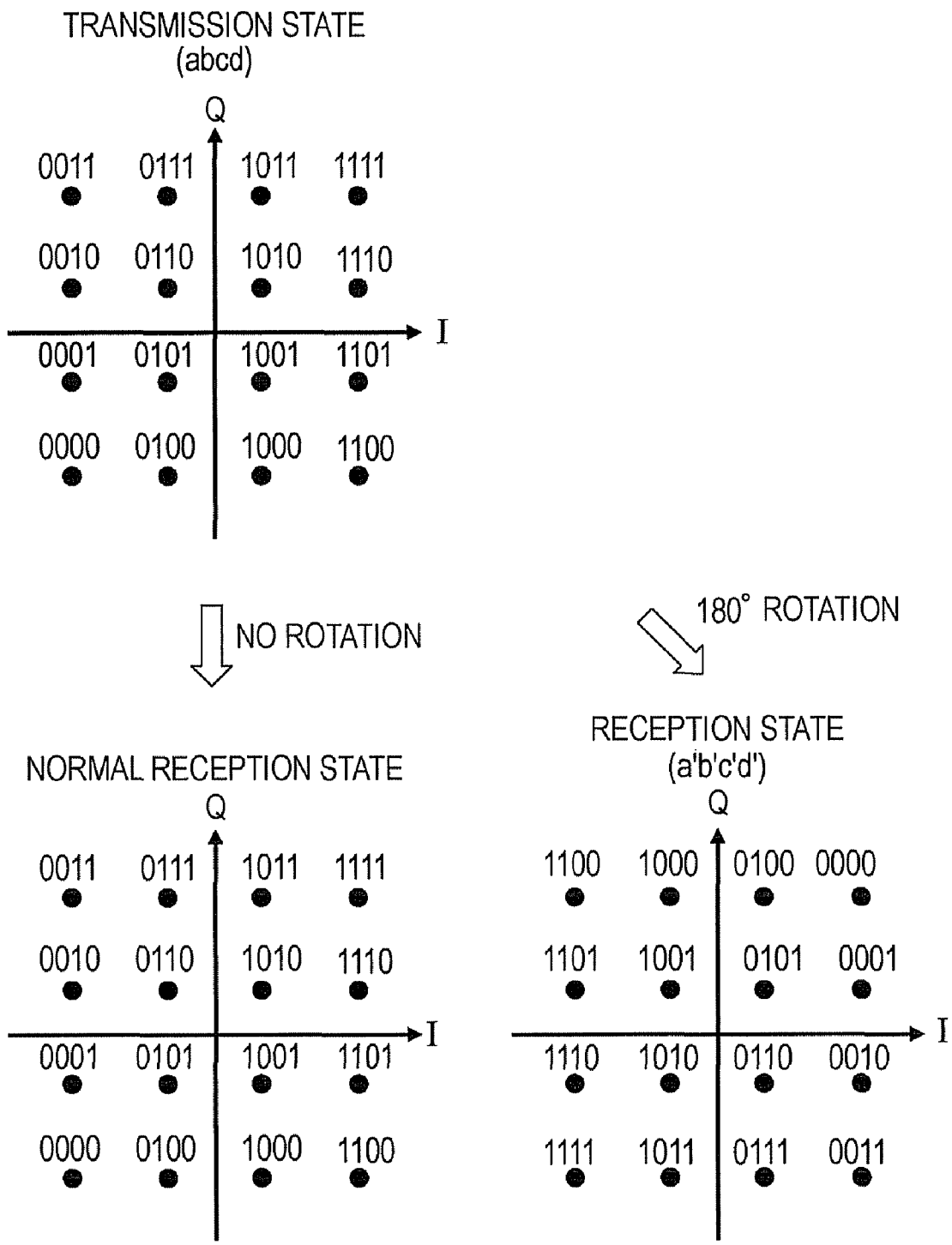
FIG. 23 is a diagram illustrating examples of a transmission state and a reception state of an optical signal based on a 16QAM system.
Figure 24:
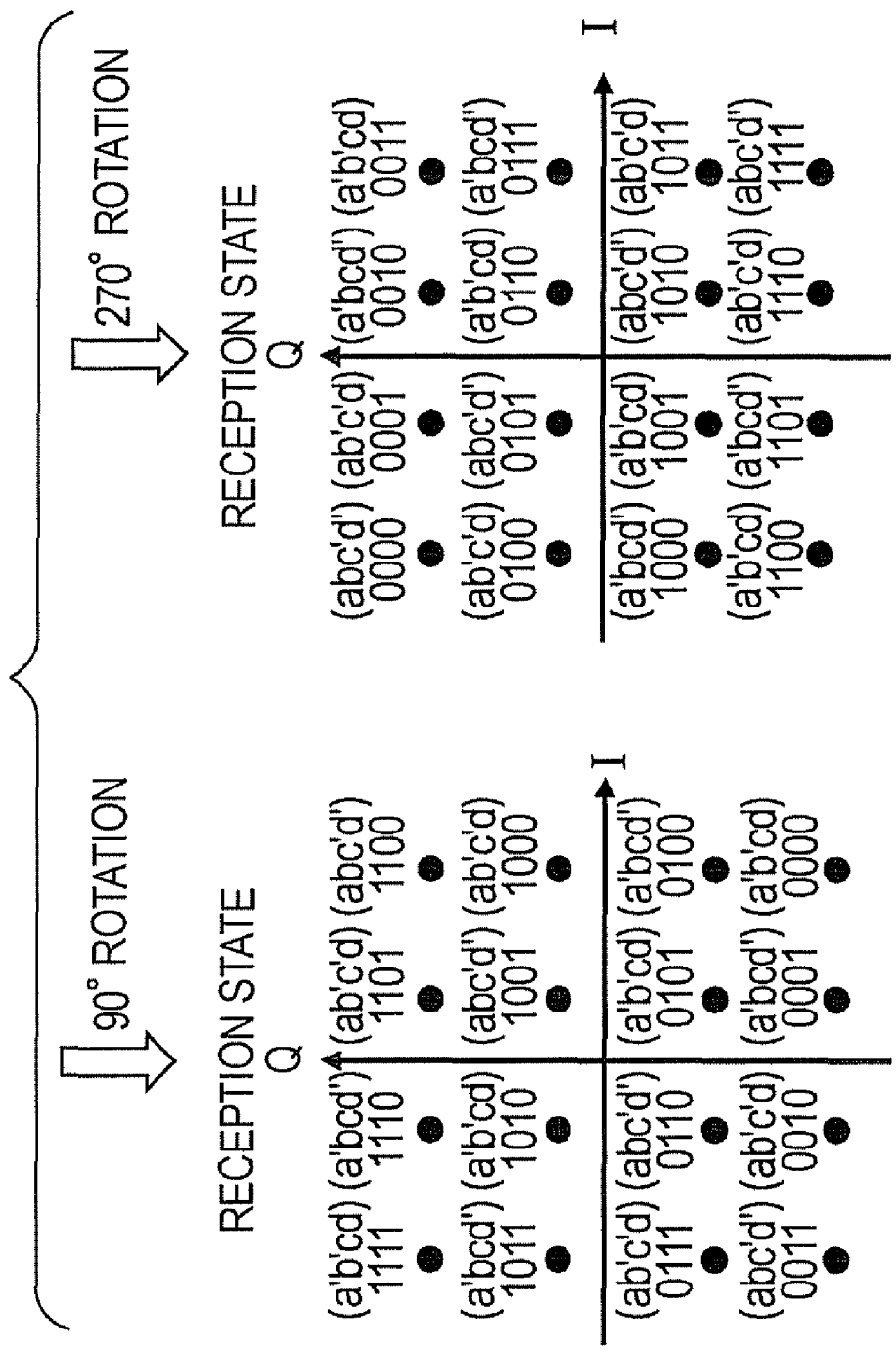
FIG. 24 is a diagram illustrating another example of the reception state of the optical signal based on the 16QAM system.

FIG. 23 and FIG. 24 are diagrams illustrating the logic inversion and the bit replacement generated in the reception data depending on the operational environment of the system in a case where the 16 QAM system is applied. The 16 QAM system may transmit 4-bit (16-value) information per symbol, and a bit state at the time of the transmission takes an arrangement illustrated in the upper left of FIG. 23. When the optical signal at such a bit arrangement is transmitted and received via the transmission line 2, in accordance with the operational environment of the system, the rotation of the quadrature axes I and Q is generated. The lower left of FIG. 23 illustrates a normal reception state without the rotation of the axes I and Q, and the reception data takes the same bit arrangement as that at the time of the transmission.

The lower right of FIG. 23 illustrates a reception state when the axes I and Q are rotated by 180° from the transmission state, and the reception data is inverted from the state at the time of the transmission. In this reception state, similarly as in the case according to the above-mentioned embodiment, in the identification compensation part 222, the data string whose FAS is detected is selectively output to the matrix switch 222D among the data string which is not subjected to the logic inversion by the logic inverter 222A and the data string subjected to the logic inversion, so that the same bit arrangement as that at the time of the transmission is realized.

Figure 25:
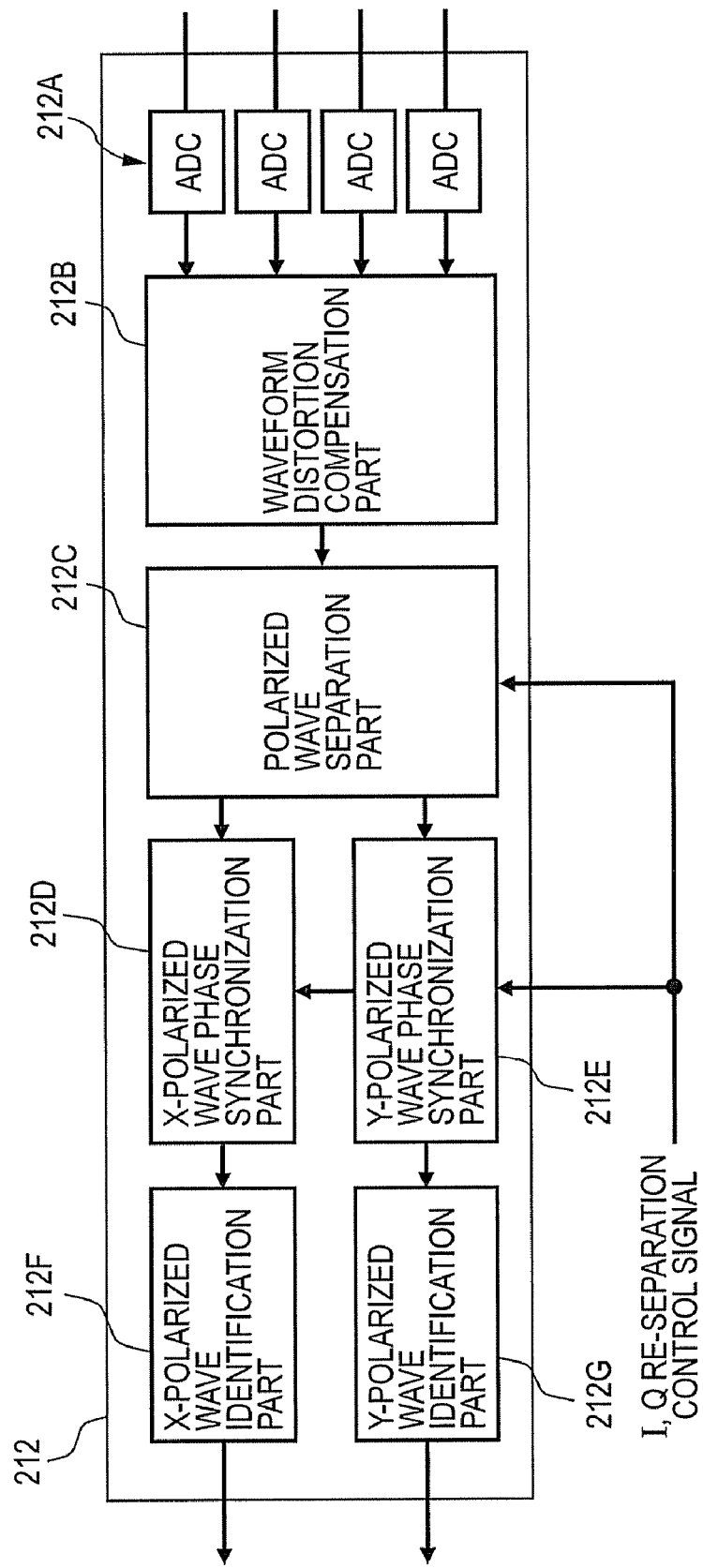
FIG. 25 is a block diagram illustrating a configuration example of a reception signal processor corresponding to the 16QAM system.

The left side of FIG. 24 illustrates a reception state when the axes I and Q are rotated by 90° from the transmission state, and the right side illustrates a reception state when the axes I and Q are rotated by 270° from the transmission state. In the respective reception states, the bit inversion is individually generated with respect to the respective bit positions (lanes). In this case, it is necessary to reattempt the separation processing for the I component and the Q component in the reception signal processor 212. To be more specific, when the lane synchronization detector 222C of the identification compensation part 222 according to the above-mentioned embodiment detects an abnormality in the identification result of the lane ID, a control signal for instructing the reception signal processor 212 to perform the re-separation processing for the I and Q components is generated, and the reception signal processor 212 receiving the control signal optimizes, as illustrated in FIG. 25, the polarized wave separation part 212C, the X-polarized wave phase synchronization part 212D, and the Y-polarized wave phase synchronization part 212E to re-separate the I and Q components for shifting the phase by 90°.

Second Embodiment

In the multi-level modulation method using the polarization multiplex like the DP-QPSK system, the transmission states of the X-polarized wave and the Y-polarized wave may not be stably maintained because of an influence from an external environment, and the X-polarized wave may be erroneously detected as the Y-polarized wave on the reception side in some cases. In this case, the decoded bit string makes no sense, and it is desirable to detect the change in the reception state in an early stage to perform the re-tracking. According to the above-mentioned embodiment, as the lane ID set to the FAS in one OTUk frame is identified and the correspondence table for the physical lane and the logical lane is created, a mismatch in the correspondence table is checked once in one frame cycle. For this reason, a timing at which the above-mentioned change in the reception state may be detected is one frame time at the shortest.

Figure 26:
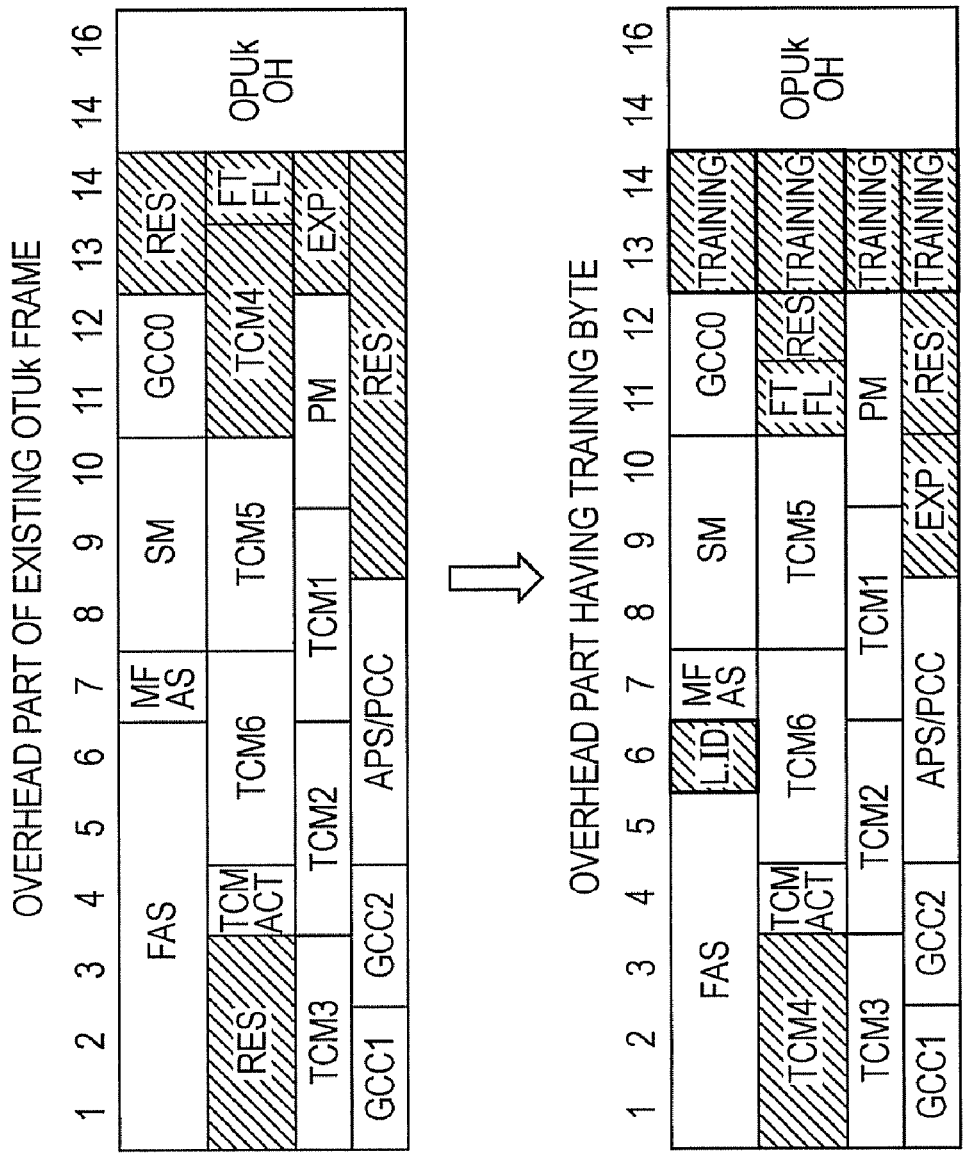
FIG. 26 is a diagram illustrating an example of an OTUk frame according to an applied example of the above-mentioned embodiment.

As an applied example for detecting the change in the reception state in an early stage by shortening the above-mentioned timing, herein, in addition to the detection method using the lane ID, a detection sequence using a training byte is used at the same time. FIG. 26 is a diagram illustrating an example of the OTUk frame in a state in which the above-mentioned training byte is set. In the example of FIG. 26, by using bits allocated to RES (Reserved for future international standardization) of the OTUk frame, the training byte is generated. To be more specific, shaded areas in the overhead part of the existing OTUk frame illustrated in the upper stage of FIG. 26 are rearranged, and the training bytes are allocated to the areas equivalent to the thirteenth and fourteenth columns. A setting is made so that the areas to which the training bytes are allocated become non-scramble areas as in the FAS.

The above-mentioned training byte preferably includes, for example, polarization information or the like indicating in which one of the X-polarized wave and the Y-polarized wave the logical lane where the training byte is arranged is transmitted when the data string in the OTUk frame is rearranged in a plurality of logical lanes. Also, the training byte may include information similar to the above-mentioned lane ID. The above-mentioned information is protected by way of a code such as CRC (Cyclic Redundancy Check), and it is also possible to improve the accuracy of the training byte.

Figure 27:
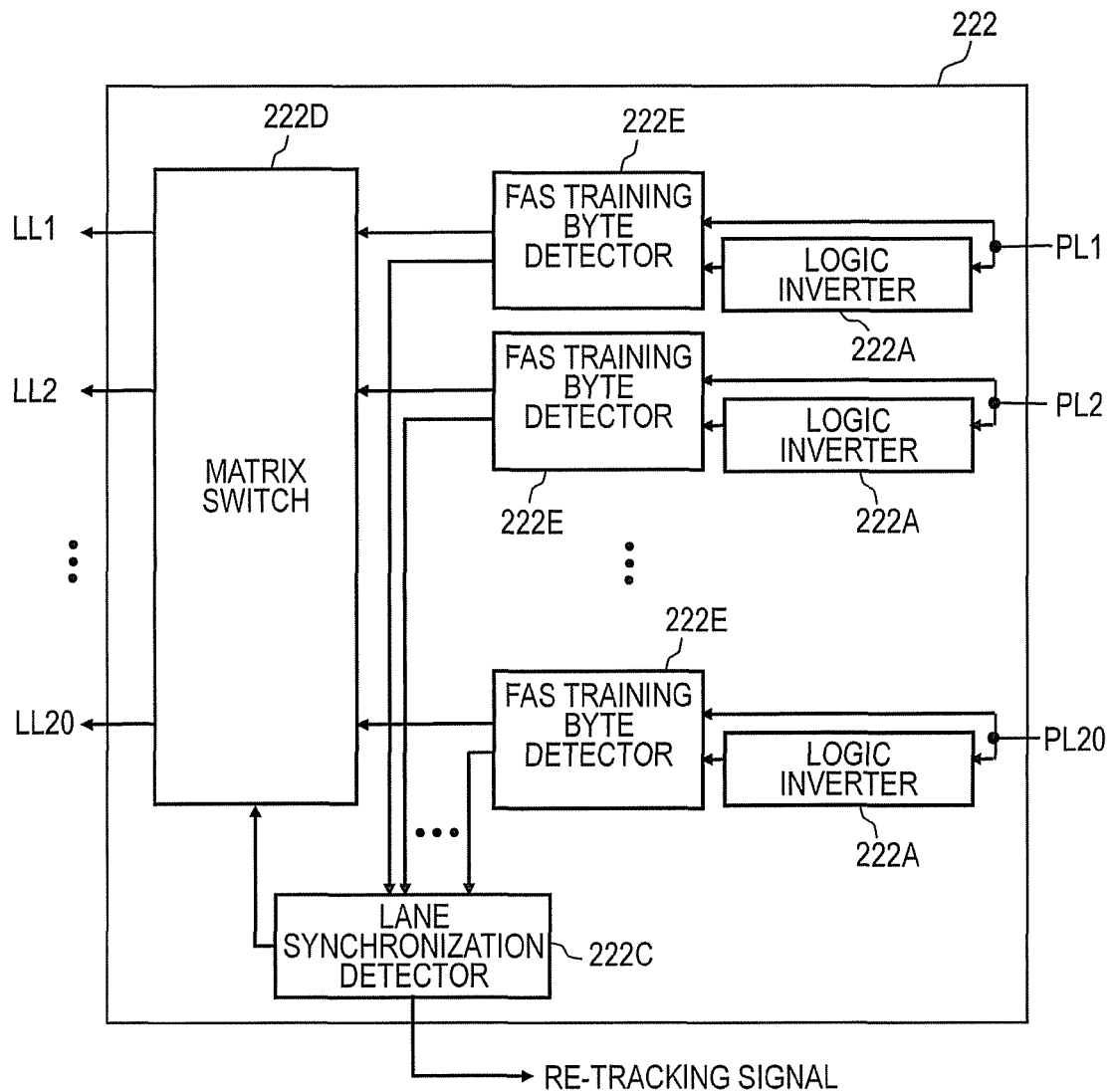
FIG. 27 is a block diagram illustrating a configuration example of an identification compensation part according to the above-mentioned applied example.

FIG. 27 is a block diagram illustrating a configuration example of the identification compensation part 222 corresponding to the above-mentioned training byte. In this configuration example, with regard to the configuration of the identification compensation part 222 according to the above-mentioned embodiment (FIG. 17), instead of the FAS detectors 222B corresponding to the respective physical lanes PL1 to PL20, an FAS training byte detector 222E provided with a detection function for not only the FAS but also the training byte is provided. It should be noted that the configuration of the identification compensation part 222 other than the FAS training byte detector 222E is similar to the case of the above-mentioned embodiment.

For a detection sequence for the FAS and the training byte by the identification compensation part 222 corresponding to the above-mentioned training byte, in the detection sequence for the FAS (FIG. 18) in the case of the above-mentioned embodiment, with respect to the data strings corresponding to the respective physical lanes (both the data strings with and without logic inversion), a processing of identifying the training byte may also be carried out at the same time as the processing of identifying the lane ID set into the FAS (S11, S13). In a case where the identification result of the training byte is different from expected information, the change in the reception state is detected, and the polarization re-tracking processing is executed.

By setting the training byte in the above-mentioned manner, the number of the timings for detecting the change in the reception state is increased to two or more in one frame time in the OTUk frame, and the detection cycle is shortened. Thus, the change in the reception state because of the change in the transmission states of the X-polarized wave and the Y-polarized wave may be detected in an even earlier stage to carry out the polarization re-tracking. Also, it is possible to create the correspondence table for the physical lane and the logical lane by using the respective identification results of the lane ID and the training byte, the processing time used for completing the correspondence table may also be further shortened.

It may be noted that in the above-mentioned applied example, the example has been illustrated in which parts of the areas in the overhead part in the OTUk frame are rearranged, and the bits allocated to the RES are used to generate the training byte, but the training byte may be stored in the RES area by using the existing frame format as it is (without rearrangement). Also, instead of the RES, the training byte may be stored in an area for FS (Fixed Stuff) in the payload part in the OTUk frame.

According to the above-mentioned optical transmission system, the data stored in the predetermined frame is rearranged in the plurality of logical lanes for dividing the frame to increase the speed of the signal processing through the frame division, and also the lane ID is set into the non-scramble area in the overhead part of the above-mentioned frame to carry out the transmission of the optical signal based on the multi-level modulation system, so that the bit inversion and the lane replacement generated in reception data depending on the operational environment of the system may be detected in an early stage by utilizing the lane ID and be certainly compensated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical transmission apparatus transmitting and receiving an optical signal generated by a multi-level modulation system capable to transmit multi-bit information within one symbol-time, the optical transmission apparatus comprising:
   a transmitting OTL processor to rearrange a data string stored in a frame into a plurality of logical lanes, and set a lane ID used to identify in which logical lane a beginning of the data string is arranged among the plurality of logical lanes in a non-scramble area in an overhead part of the frame;
   an optical transmitter to multiplex the data string rearranged into the plurality of logical lanes by the transmitting OTL processor corresponding to the multi-level modulation system, and generate a modulated optical signal based on the multiplexed data signal;
   an optical receiver to decode a received optical signal generated by the multi-level modulation system so as to regenerate a reception data, and rearrange a data string of the reception data in physical lanes of a same number as the logical lane; and
   a receiving OTL processor to respectively identify the lane IDs included in the data string in the respective physical lanes rearranged by the optical receiver, determine a generation state of a bit inversion and a lane replacement for each physical lane, compensate the bit inversion and the lane replacement so that the data string in the respective physical lanes becomes same state as the data string in the respective logical lanes, based on the identified result, and rearrange the compensated data string in the respective logical lanes so as to regenerate the frame.

2. The optical transmission apparatus according to claim 1, wherein the transmitting OTL processor sets at least one byte included in an FAS of an OTUk frame standardized by ITU-T as the lane ID.

3. The optical transmission apparatus according to claim 1, wherein the receiving OTL processor instructs the optical receiver to perform a re-tracking processing to again regenerate the reception data in a case where overlapping of the logical lanes is generated in the identified result of the lane IDs included in the data string in the respective physical lanes.

4. The optical transmission apparatus according to claim 1, wherein the transmitting OTL processor rearranges the data string into the plurality of the logical lanes so as to rearrange a first data string into the plurality of the logical lanes that has a first logical lane as a beginning of logical lanes and arrange a second data string into the plurality of the logical lanes that has a second logical lane as a beginning of the logical lanes.

5. The optical transmission apparatus according to claim 1, wherein the optical transmitter generates the modulated optical signal by a multi-level modulation system in which multi-level phase modulation and polarization multiplex are combined.

6. The optical transmission apparatus according to claim 1, wherein the optical transmitter generates the modulated optical signal by a multi-level quadrature amplitude modulation system through a combination of phase and amplitude.

7. The optical transmission apparatus according to claim 1, wherein:
the transmitting OTL processor allocates a training byte into a reserved area where is different from an area allocated to the lane ID in the frame; and
the receiving OTL processor respectively identifies the training bytes and the lane IDs included in the data string in the respective physical lanes, and determine a generation state of a bit inversion and a lane replacement for each physical lane.

8. The optical transmission apparatus according to claim 2, wherein the receiving OTL processor detects the FAS by using a common detection pattern with respect to a data string in the logical lanes and a logic-inverted data string thereof so as to identify the lane ID included in the FAS.

9. The optical transmission apparatus according to claim 2, wherein the receiving OTL processor detects the FAS by using a first detection pattern and a second detection pattern logic-inverted of the first detection pattern with respect to each of data string in the logical lanes so as to identify the lane ID included in the FAS.

10. The optical transmission apparatus according to claim 4, wherein continuous values corresponding to frame numbers are assigned to the lane IDs.

11. The optical transmission apparatus according to claim 5, wherein the receiving OTL processor instructs the optical receiver to perform a re-tracking processing to again regenerate the reception data having a different polarization state in a case where overlapping of the logical lanes is generated in the identified result of the lane IDs included in the data string in the respective physical lanes.

12. The optical transmission apparatus according to claim 6, wherein the receiving OTL processor instructs the optical receiver to perform a re-separation processing for an In-phase component and a Quadrature-phase component in a case where a fault is generated in the identified result of the lane IDs included in the data string in the respective physical lanes.

13. The optical transmission apparatus according to claim 7, wherein the transmitting OTL processor allocates the training byte into the reserved area rearranged to become to a same line in an overhead part of the frame.

14. The optical transmission apparatus according to claim 7, wherein the training byte includes polarization information indicating in which one of an X-polarized wave and a Y-polarized wave the logical lane where the training byte is arranged is transmitted when the data string is rearranged in a plurality of logical lanes.

15. An optical transmission system including a transmitter to transmit an optical signal generated by a multi-level modulation system capable to transmit multi-bit information within one symbol-time to a transmission line and a receiver to receive the optical signal transmitted from the transmitter through the transmission line, the optical transmission system comprising:

frame division means in the transmitter for rearranging a data string stored in a frame into a plurality of logical lanes, and setting a lane ID used to identify in which logical lane a beginning of the data string is arranged among the plurality of logical lanes in a non-scramble area in an overhead part of the frame;
optical transmission means in the transmitter for multiplexing the data string rearranged into the plurality of logical lanes by the frame division means corresponding to the multi-level modulation system, and generating a modulated optical signal based on the multiplexed data signal;
optical reception means in the receiver for decoding a received optical signal generated by the multi-level modulation system so as to regenerate a reception data, and rearranging a data string of the reception data in physical lanes of a same number as the logical lane; and
frame regeneration means in the receiver for respectively identifying the lane IDs included in the data string in the respective physical lanes rearranged by the optical receiver, determining a generation state of a bit inversion and a lane replacement for each physical lane, compensating the bit inversion and the lane replacement so that the data string in the respective physical lanes becomes same state as the data string in the respective logical lanes, based on the identified result, and rearranging the compensated data string in the respective logical lanes so as to regenerate the frame.

16. An optical transmission method transmitting and receiving an optical signal generated by a multi-level modulation system capable to transmit multi-bit information within one symbol-time, the optical transmission method comprising:
rearranging a data string stored in a frame into a plurality of logical lanes;
setting a lane ID used to identify in which logical lane a beginning of the data string is arranged among the plurality of logical lanes in a non-scramble area in an overhead part of the frame;
multiplexing the data string rearranged into the plurality of logical lanes corresponding to the multi-level modulation system;
generating a modulated optical signal based on the multiplexed data signal;
decoding a received optical signal generated by the multi-level modulation system so as to regenerate a reception data;
rearranging a data string of the reception data in physical lanes of a same number as the logical lane;
identifying respectively the lane IDs included in the data string in the respective physical lanes rearranged by the optical receiver;
determining a generation state of a bit inversion and a lane replacement for each physical lane;
compensating the bit inversion and the lane replacement so that the data string in the respective physical lanes becomes same state as the data string in the respective logical lanes, based on the identified result; and
rearranging the compensated data string in the respective logical lanes so as to regenerate the frame.

* * * * *

UNITED STATES PATENT AND TRADEMARK OFFICE
CERTIFICATE OF CORRECTION

| | |
|---|---|
| PATENT NO. | : 8,331,793 B2 |
| APPLICATION NO. | : 12/813810 |
| DATED | : December 11, 2012 |
| INVENTOR(S) | : Osamu Takeuchi et al. |

It is certified that error appears in the above-identified patent and that said Letters Patent is hereby corrected as shown below:

Column 21, Line 11, In Claim 7, delete "where" and insert -- which --, therefor.

Signed and Sealed this
Fifth Day of March, 2013

Teresa Stanek Rea
*Acting Director of the United States Patent and Trademark Office*